(12) United States Patent
Harlan

(10) Patent No.: US 6,650,072 B2
(45) Date of Patent: Nov. 18, 2003

(54) APPARATUS AND METHOD OF REGULATING THE SPEED OF A BRUSHLESS DC MOTOR

(75) Inventor: George H. Harlan, Hanson, MA (US)

(73) Assignee: Nidec America Corporation, Torrington, CT (US)

( * ) Notice: Subject to any disclaimer, the term of this patent is extended or adjusted under 35 U.S.C. 154(b) by 0 days.

(21) Appl. No.: 09/944,809

(22) Filed: Aug. 31, 2001

(65) Prior Publication Data

US 2002/0105293 A1 Aug. 8, 2002

Related U.S. Application Data

(63) Continuation of application No. 09/396,396, filed on Sep. 15, 1999, now Pat. No. 6,285,146, which is a continuation-in-part of application No. 09/131,046, filed on Aug. 7, 1998, now Pat. No. 6,188,187.

(51) Int. Cl.$^7$ .................................................. H02P 6/00
(52) U.S. Cl. ...................................................... 318/254
(58) Field of Search ................................ 318/138, 254, 318/432, 433, 439

(56) References Cited

U.S. PATENT DOCUMENTS

| | | | |
|---|---|---|---|
| 3,663,876 A | | 5/1972 | McBride, Jr. et al. .. 318/221 D |
| 3,916,272 A | * | 10/1975 | Grunleitner et al. ........ 318/138 |
| 3,986,100 A | | 10/1976 | Beierholm et al. ......... 323/285 |
| 4,132,930 A | * | 1/1979 | Schalk ........................ 318/138 |
| 4,306,181 A | * | 12/1981 | Welburn ..................... 318/696 |
| 4,319,175 A | | 3/1982 | Leenhouts ................... 318/696 |
| 4,328,454 A | * | 5/1982 | Okuyama et al. ........... 318/803 |
| 4,329,630 A | * | 5/1982 | Park ........................... 318/258 |
| 4,488,101 A | | 12/1984 | Studtmann .................. 318/800 |
| 4,511,829 A | | 4/1985 | Wisniewski ................. 318/317 |
| 4,580,090 A | * | 4/1986 | Bailey et al. ................ 323/303 |
| 4,700,116 A | * | 10/1987 | Inoue et al. ................. 318/254 |

(List continued on next page.)

Primary Examiner—Bentsu Ro
(74) Attorney, Agent, or Firm—Cummings & Lockwood LLC

(57) ABSTRACT

A control circuit is provided for regulating the rotational speed of a brushless DC motor by pulse width modulating at least one power transistor to pass a motor supply signal to the motor armature. A voltage averaging circuit generates an averaged signal indicative of the average voltage level being supplied to the motor. The averaged voltage signal is compared against a reference voltage to determine motor speed error in order to maintain the rotational speed of the motor at a generally constant level. A sawtooth or other periodic ramp signal is added to a motor current signal, and this composite signal is monitored by a comparator until it overcomes the motor speed error signal. The pwm circuit thereby modulates the power supply to regulate motor speed while maintaining a symmetrical motor armature current waveform. The control circuit takes advantage of the inherent inductance of the motor windings and the moment of inertia of the rotor assembly as filters to help smooth the physical operation of the motor and to further maintain its desired rotational speed.

21 Claims, 11 Drawing Sheets

U.S. PATENT DOCUMENTS

| | | | | |
|---|---|---|---|---|
| 4,755,728 A | | 7/1988 | Ban | 318/254 |
| 4,780,656 A | | 10/1988 | Mitchell | 318/798 |
| 4,788,485 A | | 11/1988 | Kawagishi et al. | 318/811 |
| 4,804,892 A | * | 2/1989 | Muller | 318/254 |
| 4,855,652 A | * | 8/1989 | Yamashita et al. | 318/268 |
| 4,933,828 A | | 6/1990 | Ogawa et al. | 363/81 |
| 4,952,853 A | | 8/1990 | Archer | 318/254 |
| 5,001,413 A | | 3/1991 | Ohms | 323/285 |
| 5,005,100 A | | 4/1991 | Owen | 361/35 |
| 5,077,824 A | * | 12/1991 | Nagata et al. | 388/819 |
| 5,287,044 A | * | 2/1994 | Izawa et al. | 318/138 |
| 5,321,342 A | * | 6/1994 | Kruse | 318/254 |
| 5,351,336 A | | 9/1994 | Wilkerson | 388/809 |
| 5,359,278 A | | 10/1994 | Notohara et al. | 323/222 |
| 5,493,187 A | | 2/1996 | Iijima | 318/254 |
| 5,606,232 A | | 2/1997 | Harlan et al. | 318/138 |
| 5,625,264 A | | 4/1997 | Yoon | 318/254 |
| 5,625,424 A | | 4/1997 | Conner et al. | 348/743 |
| 5,640,073 A | | 6/1997 | Ikeda et al. | 318/439 |
| 5,723,968 A | | 3/1998 | Sakurai | 318/802 |
| 5,780,986 A | | 7/1998 | Shelton et al. | 318/432 |
| 5,825,972 A | | 10/1998 | Brown | 388/811 |
| 5,847,530 A | | 12/1998 | Hill | 318/599 |
| 5,901,268 A | | 5/1999 | Ando et al. | 388/811 |

* cited by examiner

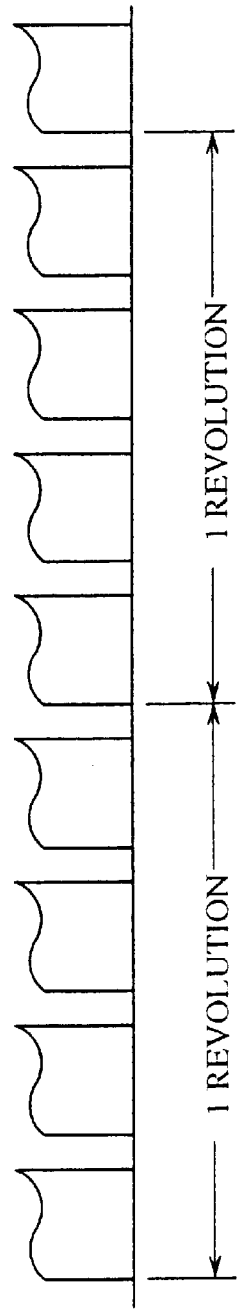
FIG. 5A   NO CURRENT COMPENSATION IDEAL COMMUTATION
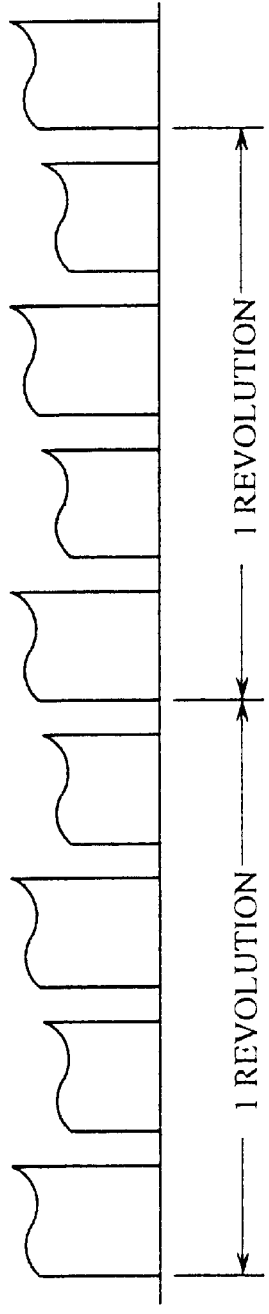
FIG. 5B   NO CURRENT COMPENSATION NON-IDEAL COMMUTATION
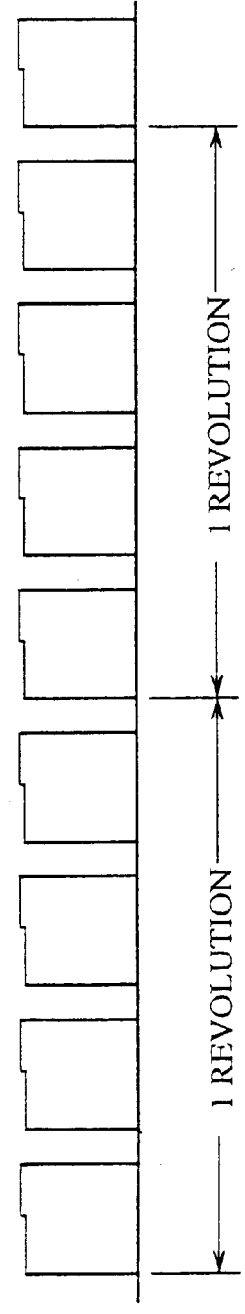
FIG. 5C   CURRENT COMPENSATION APPLIED FIG. 8A    UNCORRECTED INPUT CURRENT
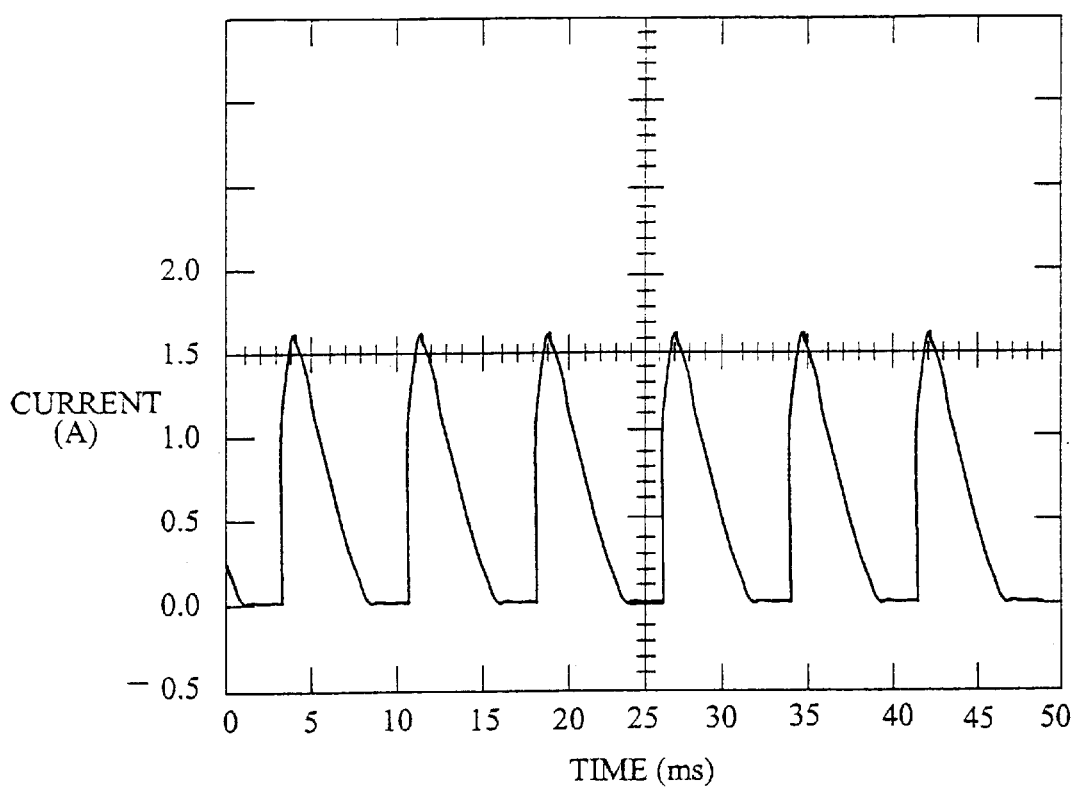
FIG. 8B    CORRECTED INPUT CURRENT
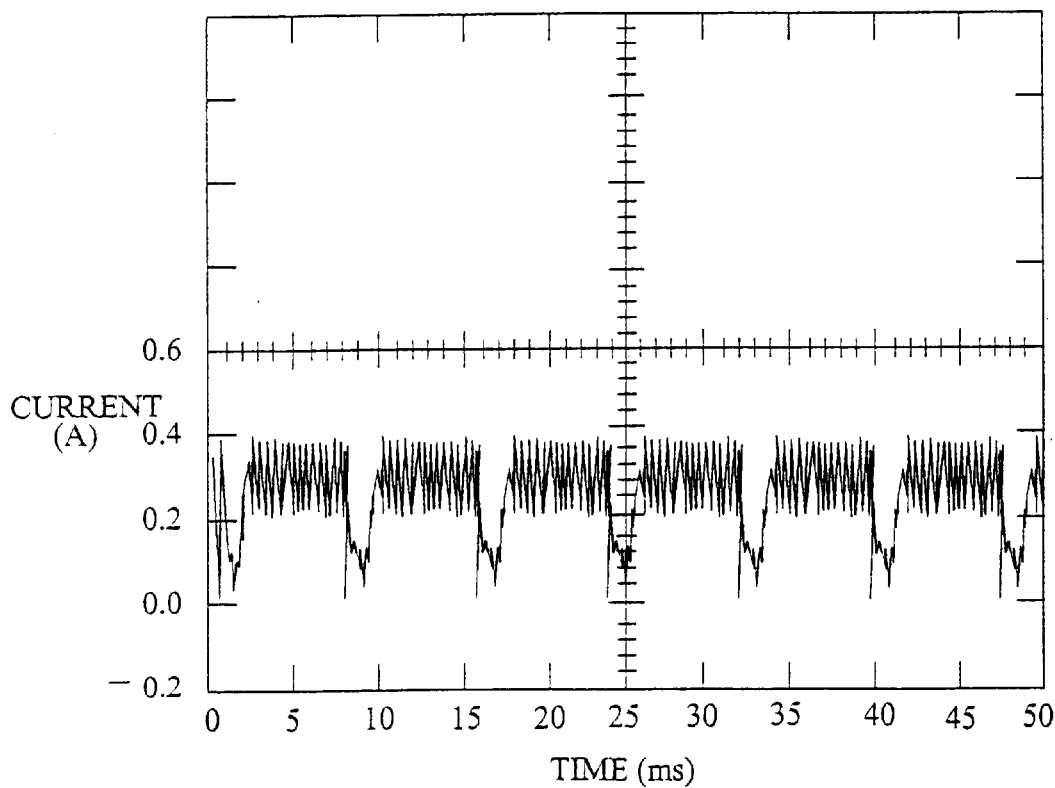

FIG. 9A    UNCORRECTED INPUT CURRENT
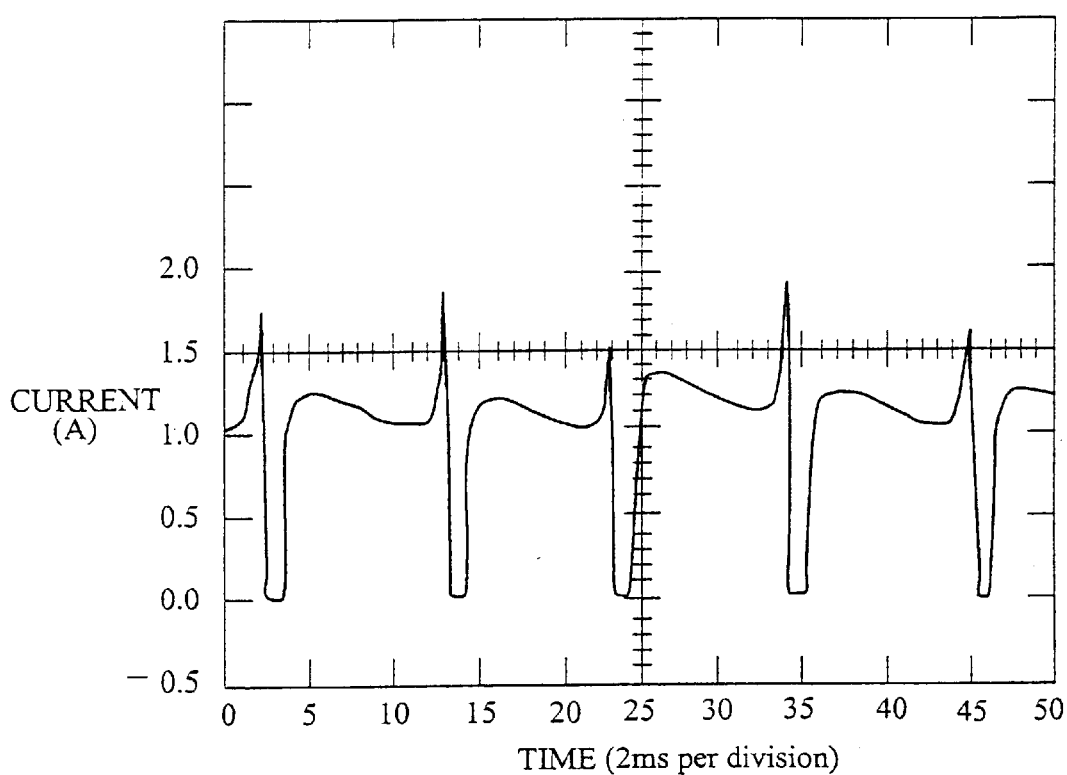
FIG. 9B    CORRECTED INPUT CURRENT
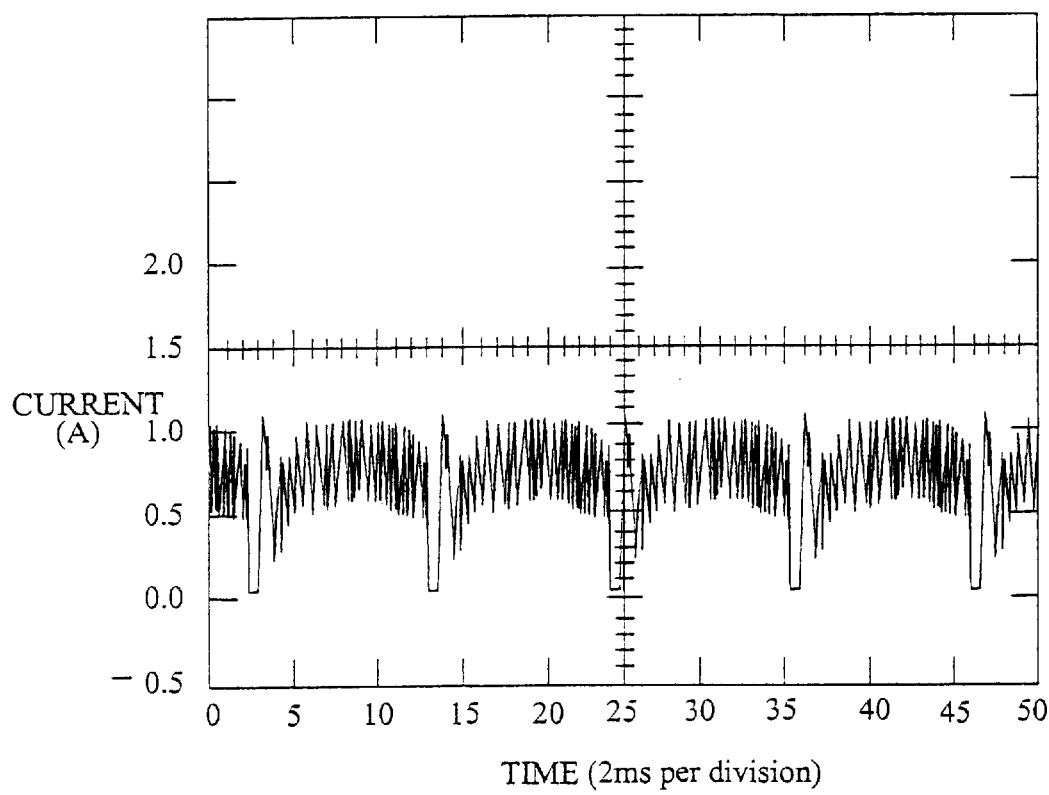

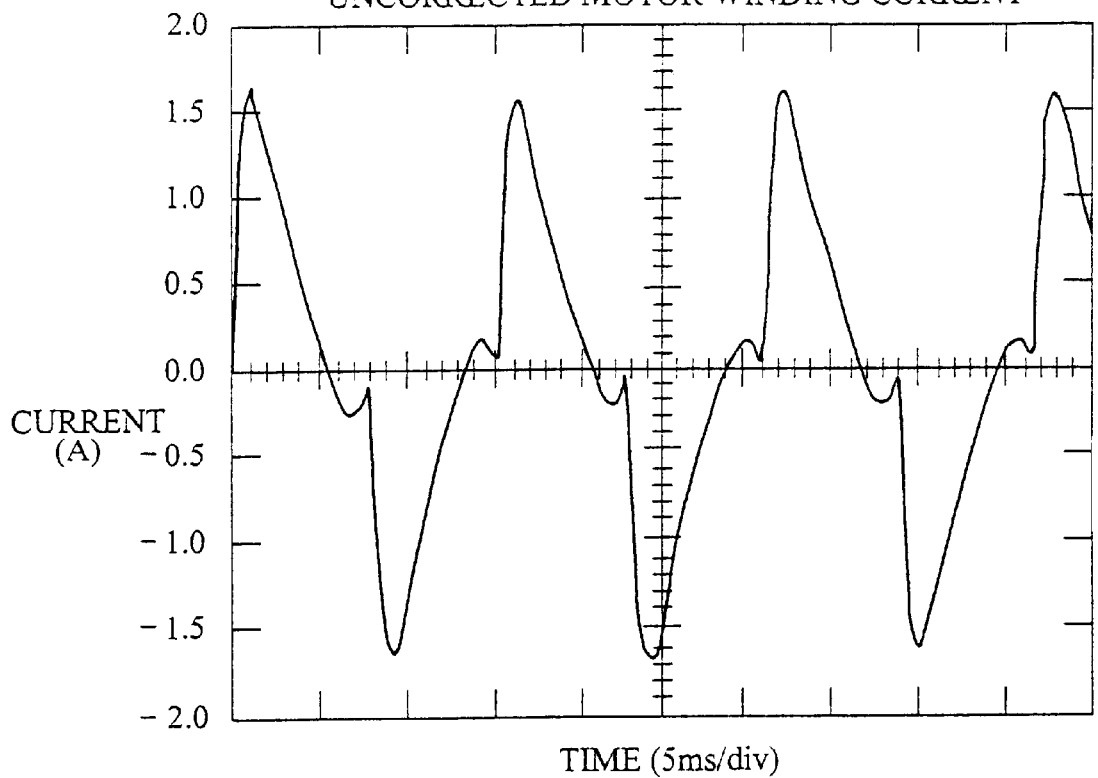
FIG. 10A  UNCORRECTED MOTOR WINDING CURRENT
TIME (5ms/div)
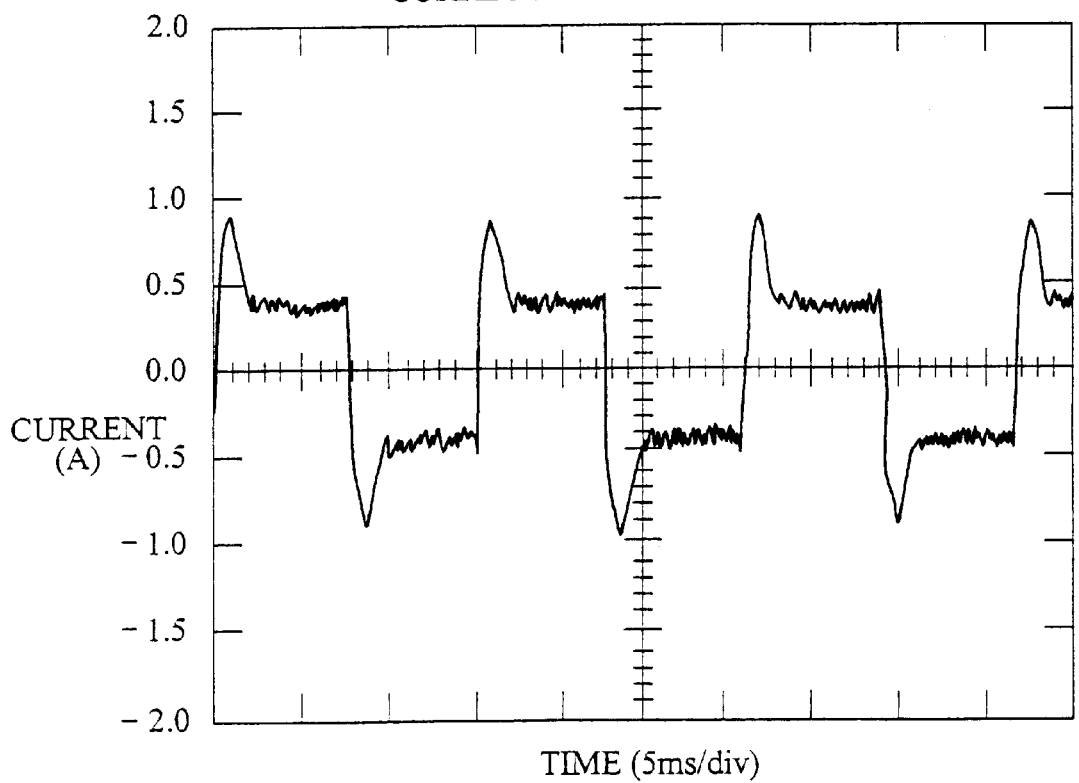
FIG. 10B  CORRECTED MOTOR WINDING CURRENT
TIME (5ms/div)

UNCORRECTED MOTOR WINDING CURRENT

TIME (2ms/div)

CORRECTED MOTOR WINDING CURRENT

TIME (2ms/div)

APPARATUS AND METHOD OF REGULATING THE SPEED OF A BRUSHLESS DC MOTOR

CROSS-REFERENCE TO RELATED APPLICATION

This patent application is a continuation of U.S. patent application Ser. No. 09/396,396, filed Sep. 15, 1999, now U.S. Pat. No. 6,285,146, which is a continuation-in-part of U.S. patent application Ser. No. 09/131,046, filed Aug. 7, 1998, now U.S. Pat. No. 6,188,187, each of which is co-pending herewith, and is incorporated by reference herein.

FIELD OF THE INVENTION

The present invention relates generally to a motor controller, and more particularly to a controller for controlling the rotational speed and armature current of a brushless DC motor.

BACKGROUND OF THE INVENTION

Control circuits are known for controlling brushless DC motors, such as, for example, regulating the rotational speed of brushless DC fan motors that cool the interiors of computers. One problem with brushless DC fan motors is that they traditionally have had a narrow usable input range. Fan speed and input current are approximately proportional to input voltages. Thus, if the input voltage from an unregulated source such as a battery were used to power a brushless DC fan, such as a typical 24 volt nominal battery, the voltage would vary from about 28 volts in float state to about 21 volts in discharged state. This change would cause a brushless DC fan rated at a nominal 3500 RPM to vary as much as about 1000 RPM over the above-mentioned range of battery voltages. Such a large variation in RPM means that the fan is not properly cooling a computer at the low-end of the RPM range, and that power is being wasted at the high-end of the RPM range.

Some brushless DC fan users have multiple input source voltages that their equipment is expected to operate from, with 24 volt and 48 volt systems being the most common. Such multiple source voltages pose the same problem in resultant RPM variation in a brushless DC fan motor as does a single input voltage source whose voltage level varies widely. Accordingly, there is a need to provide a brushless DC fan motor having a high input range with relatively little variation in motor rotational speed. For example, in the telecommunications industry, there is a need to provide a brushless DC fan motor having an input range of about 20–60 volts with little variation in motor rotational speed. However, other input voltage ranges may be provided for other motor applications.

Linear regulators have been used to regulate brushless DC fan rotational speed. However, the linear regulator approach poses an efficiency problem. A brushless DC fan that draws 18 watts at 21 volts will draw almost 27 watts when operating at 28 volts, and 54 watts at 56 volts input, with the increase in power draw having to be dissipated as heat.

Pulse width modulation ("pwm") has also been used in the prior art to regulate motor speed. One method commonly used is to pulse width modulate the commutation transistors to the brushless DC motor. This employment of pulse width modulation reduces the dissipation of energy involved with changing motor speed. However, pulse width modulating the commutation transistors does not permit large changes in input voltage without widely varying the rotational speed of the brushless DC motor. This method is most commonly used in thermal brushless DC fans to reduce brushless DC fan speed at low temperatures. The speed variation is unfortunately even wider than that of the non-speed controlled type, and clamp dissipation is still relatively high.

Another pwm approach is to use a fill bridge driver. This involves placing a bipolar motor winding between the legs of four switching transistors and controlling the timing of the pwm modulator and commutation logic to regulate motor current. Wide input voltage ranges are possible with high efficiency. A well designed full bridge driver can regulate motor speed over a better than 3:1 range of input voltage. The chief drawbacks are complicated logic and the difficulties of driving the four switching transistors without cross conduction through the series connected pairs. Although many manufacturers offer integrated full bridge devices, most suffer from a limitation of current and/or voltage.

Another approach is to employ a pwm switching voltage regulator to accommodate a wide range of input voltages without widely varying the rotational speed of the motor. However, this requires relatively bulky filter inductors and capacitors.

Of the above-mentioned pwm approaches, the pwm voltage regulator regulates motor voltage. The other methods typically regulate motor current. Voltage regulation is preferred to minimize variations in desired brushless DC motor speed. In other words, the variation in motor speed from motor to motor for a given current is greater than the variation in motor speed for a given voltage. Additionally, motor torque is a function of motor current. Therefore, if motor current is reduced in order to reduce motor speed to a low value, the motor torque becomes low. This means that the motor speed is sensitive to applied load (i.e., back pressure). This sensitivity to back pressure results in large speed deviations from the desired value. Motor-starting at low desired speeds is also a problem in that if the motor current is set too low then the motor will not be able to overcome the magnetic detents used to position the rotor away from the null point. Unfortunately, controlling motor voltage while failing to control motor current to adhere to a symmetrical waveform has the potential to increase vibration and electrical interference.

Fans typically use one of two types of two-phase DC brushless motors, unipolar or bipolar. The difference between the two types is that a unipolar motor energizes two opposing poles of the four poles available, whereas a bipolar motor will energize all four poles at the same time, with the coils in quadrature having opposite magnetic polarity. Simply stated the unipolar type uses two pairs of coils with one pair energized and the other pair not energized, with the poles always energized in the same polarity. The bipolar motor energizes the four poles at the same time with adjacent poles having opposite polarity. Rotation of the motor of the unipolar type is accomplished by alternating energized pairs while the bipolar motor changes the polarity of the four poles.

The bipolar motor has double the output of the unipolar motor because all of the copper is utilized and all four poles act upon the magnet. Drive complexity is greater as the direction of current must be reversed rather than just interrupted. In both cases however a problem of asymmetrical current in the motor exists. The current in the motor windings is reversed twice for each complete revolution of the bipolar motor. Various factors influence or modify the symmetry of the motor such as the degree of magnet strength, offset in the position sensor, mechanical variations in the motor components, and variations in wire resistance. This causes the current levels and the waveform shapes to differ from each other within a rotational period and allow different torques to be applied to the rotor, increasing vibration and noise. Accordingly, it would be desirable to provide an apparatus and method which may correct such non-ideal behavior in both unipolar and bipolar motors.

It is also an object of the present invention to provide a brushless DC motor regulator which handles a relatively wide range of input voltages with little variation in the rotational speed of the motor.

It is another object of the present invention to provide a brushless DC motor regulator which controls motor armature current to a substantially symmetrical waveform.

It is a further object of the present invention to provide a brushless DC motor regulator that eliminates the relatively bulky filter capacitors and inductors interfacing the regulator and motor.

The above and other objects and advantages of the present invention will become more readily apparent when the following detailed description is read in conjunction with the accompanying drawings.

SUMMARY OF THE INVENTION

According to one aspect of the present invention a control circuit for controlling the rotational speed of a brushless DC motor is provided. The control circuit includes an electrical conduction switch having an input, an output, and a control terminal for passing a motor supply signal to a brushless DC motor from a voltage across first and second terminals of a DC voltage source. The input terminal of the switch is to be coupled to the first terminal of the DC voltage source, and the output terminal of the switch is to be coupled to the first terminal of the brushless DC motor. A voltage averaging circuit is provided having first and second input terminals and an output terminal for averaging the voltage level of the motor supply signal. The first input terminal of the voltage averaging circuit is coupled to the output of the switch, and the second terminal of the voltage averaging circuit is to be coupled to the second terminal of the voltage source. A differential amplifier has first and second input terminals and an output terminal for generating a signal corresponding to motor speed error. The first input terminal of the differential amplifier is coupled to a voltage reference potential indicative of the desired motor speed, and the second input terminal of the differential amplifier is coupled to the output terminal of the voltage averaging circuit.

A pulse width modulator ("pwm") of the control circuit has first and second input terminals and an output terminal. The first input terminal of the pwm is coupled to the output terminal of the differential amplifier for receiving the signal corresponding to motor speed error, the second input terminal of the pwm is coupled to a signal corresponding to the change in motor current, and the output terminal of the pwm is coupled to the control terminal of the electrical conduction switch. The pwm turns the switch on at a periodic rate, and turns the switch off after a delay, or pulse width, indicative of the difference in voltage level between the signal corresponding to motor speed error and the signal corresponding to change in motor current, in order to provide a motor supply signal having a substantially constant average voltage level corresponding with the desired motor speed and a substantially symmetrical current waveform. Preferably, the motor windings serve as an inductive filter to help smooth changes in current, and the rotor mass of the motor serves to help smooth the rotational speed of the motor.

According to another aspect of the present invention, a control circuit for controlling the rotational speed of a brushless DC motor is provided. The control circuit includes first means to be coupled to an electrical power source for switchably passing a motor supply signal to a brushless DC motor. A second means is coupled to an output of the first means for generating an averaged signal by averaging the voltage of the motor supply signal. A third means is coupled to an output of the first means for generating a signal indicative of the change in motor current. A fourth means is coupled to an output of the second means for generating a speed error signal having a voltage level indicative of the difference in voltage between the voltage level of the averaged signal of the second means and a reference voltage. A fifth means turns on the first means periodically, and turns off the first means following a delay corresponding to the difference between the value of the speed error signal and the value of the change in motor current signal. These means provide a substantially constant average motor supply voltage level resulting in a substantially constant motor speed approximately equal to a desired motor speed, and a substantially symmetrical motor current supply signal waveform.

According to yet another aspect of the present invention, a method of controlling the rotational speed of a brushless DC motor is provided. A motor supply signal is switchably passed from an electrical power source to a brushless DC motor. The voltage level of the motor supply signal is averaged to form an averaged signal. An error signal is generated having a voltage level indicative of the difference in voltage between the averaged signal and a reference voltage. A motor current signal is generated having a voltage level indicative of the change in current of the motor supply signal. The motor supply signal is modulated in response to the difference in value between the error signal and the motor current signal in order to provide a substantially constant voltage level and a substantially symmetrical motor current waveform.

According to another aspect, the present invention is directed to a method of regulating the rotational speed of a DC brushless motor, wherein the motor has at least one input terminal, a plurality of motor windings electrically coupled to the at least one input terminal, and a rotor defining a rotor mass and electromagnetically coupled to the motor windings and rotatable by interaction with an electromagnetic field generated by current flowing through the motor windings. The method comprises the following steps:

(i) passing motor supply signals from an electrical power source through an electrical conduction switch having an input, an output, and a control terminal;

(ii) pulse width modulating the motor supply signals passing through the electrical conduction switch and generating pulse width modulated motor supply signals;

(iii) transmitting the pulse width modulated motor supply signals through a substantially inductorless path extending from the output of the electrical conduction switch to the at least one input terminal;

(iv) using the windings of the motor to integrate the pulse width modulated motor supply signals and function as an inductor filter to smooth the current level of the motor supply signals; and (v) using the rotor mass as a filter capacitor to smooth the voltage level of the motor supply signals.

According to yet another aspect, the present invention is directed to a control circuit for regulating the rotational speed of a DC brushless motor, wherein the motor has at least one input terminal, a plurality of motor windings electrically coupled to the at least one input terminal, and a rotor defining a rotor mass and electromagnetically coupled to the motor windings and rotatable by interaction with an electromagnetic field generated by current flowing through the motor windings. The control circuit comprises an electrical conduction switch having an input, an output, and a control terminal for passing a motor supply signal to the DC brushless motor from a voltage across first and second terminals of a DC voltage source. The input terminal of the switch is coupled to the first terminal of the DC voltage source, and the output terminal of the switch is coupled to the at least one input terminal of the motor. A substantially inductorless path extends from the output of the electrical conduction switch to the at least one input terminal of the motor. A pulse width modulator has an output terminal coupled to the control terminal of the electrical conduction switch for pulse width modulating the motor supply signals passing through the electrical conduction switch and generating pulse width modulated motor supply signals. The pulse width modulated motor supply signals are transmitted through the substantially inductorless path extending from the output of the electrical conduction switch to the at least one input terminal. The windings of the motor integrate the pulse width modulated motor supply signals and function as an inductor filter to smooth the current level of the motor supply signals. And the rotor mass functions as a filter capacitor to smooth the voltage level of the motor supply signals.

One advantage of the preferred embodiments of the present invention is that the motor voltage signal is compared against the reference voltage to generate an error signal, and the error signal is in turn compared against the motor current signal to pulse width modulate the motor input signal. Accordingly, the preferred embodiments of the apparatus and method of the present invention employ both a voltage feedback loop, and a current feedback loop embedded within the voltage feedback loop to maintain a substantially constant motor speed over a wide range of power supply voltages, to accurately select and control motor speed, and to do so while maintaining a substantially symmetrical armature current waveform.

BRIEF DESCRIPTION OF THE DRAWINGS

FIGS. 5A–5C illustrate three current waveform inputs to a motor demonstrating typical waveform improvements of the pwm sub-circuit of FIG. 4 when used in the pwm voltage regulator of FIG. 2.

FIGS. 8A–8B illustrate two current waveform inputs to a motor operating at about 2000 RPM demonstrating typical waveform improvements of the pwm circuit of FIG. 7 when used with the pwm voltage regulator of FIG. 6.

FIGS. 9A–9B illustrate two current waveform inputs to a motor operating at about 3500 RPM demonstrating typical waveform improvements of the pwm circuit of FIG. 7 when used with the pwm voltage regulator of FIG. 6.

FIGS. 10A–10B illustrate two motor winding current waveforms in a motor operating at about 2000 RPM demonstrating typical waveform improvements of the pwm circuit of FIG. 7 when used with the pwm voltage regulator of FIG. 6.

DETAILED DESCRIPTION OF THE PREFERRED EMBODIMENTS

Figure 1:
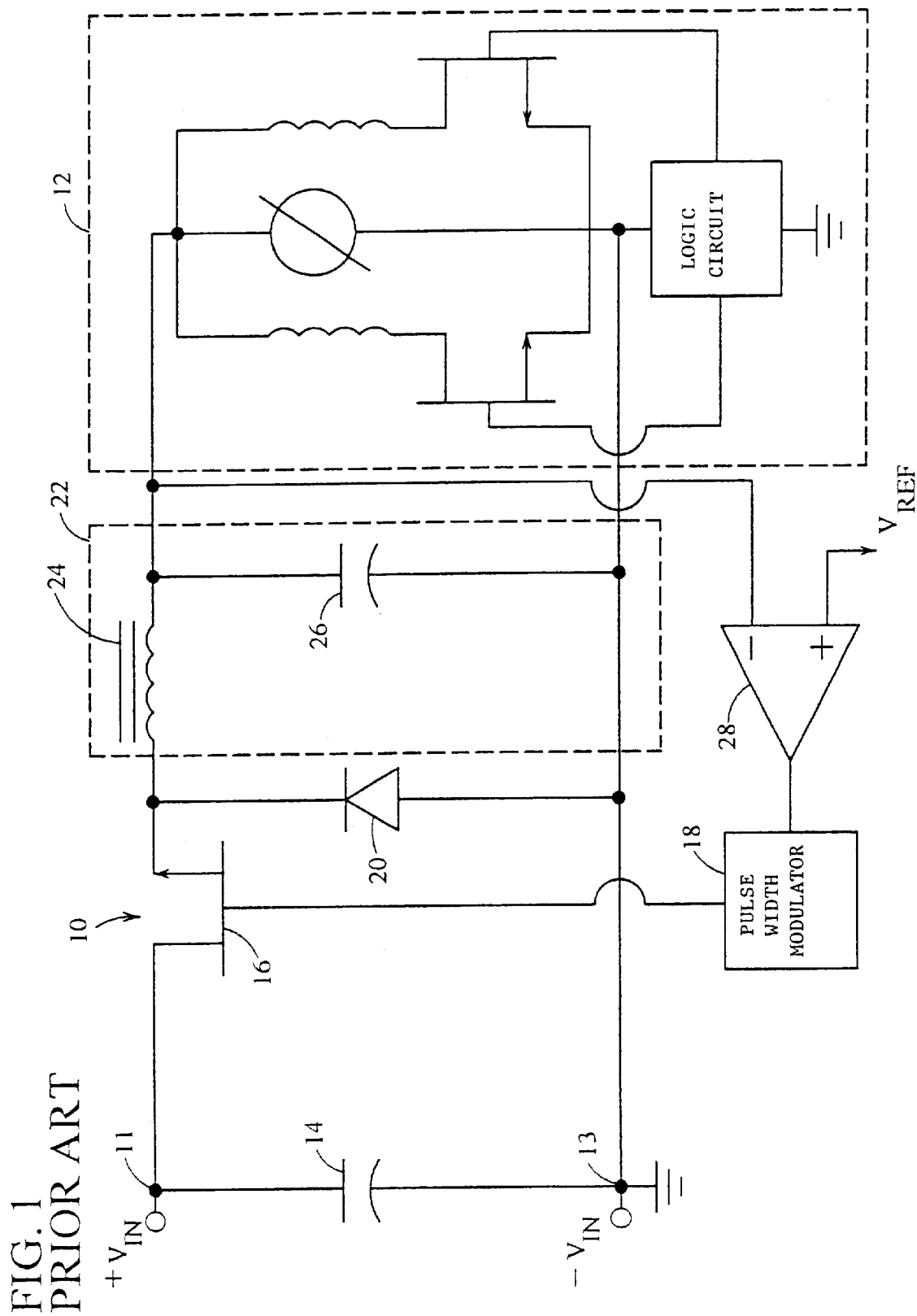
FIG. 1 illustrates schematically a prior art electrical circuit of a pwm voltage regulator employing filter capacitors and inductors interfacing the regulator to a brushless DC motor.

A prior art pwm voltage regulator will first be explained as background to the pwm voltage regulator embodying the present invention. Referring now to the prior art of FIG. 1, a pwm voltage regulator is indicated generally by the reference number 10 and is employed to control the rotational speed of a brushless DC motor 12 enclosed by dashed lines. The regulator 10 includes a positive terminal 11 and a negative terminal 13 for receiving a regulator DC input voltage from a power source (not shown). The pwm voltage regulator 10 includes an input filter 2(capacitor 14, a pwm power transistor 16 that is switched on and off by a pwm modulator 18, a catch diode 20, and an output filter circuit 22 enclosed by dashed lines which includes an output filter inductor 24 and an output filter capacitor 26. The output filter inductor 24 and the output filter capacitor 26 are typically rather bulky, thereby imposing design constraints in relation to the increasing demand for smaller voltage regulators that are either separate from or incorporated in brushless DC motors. The demand for smaller regulated motors is particularly high in the computer industry which uses DC fan units incorporating regulated brushless DC motors for cooling electronic components.

The output filter circuit 22 smoothes a pwm waveform generated by the pwm modulator 18 and the switching transistor 16 into a motor supply signal having an average DC voltage level. This average DC voltage level of the DC motor input signal determines the rotational speed of the motor 12. In order to maintain the rotational speed of the brushless DC motor at a generally constant revolutions per minute (rpm), feedback is provided to the regulator 10. To provide feedback, the voltage level of the DC motor input signal is received at the inverting input of a differential or error amplifier 28 and compared with a reference voltage $V_{ref}$ which is provided at the non-inverting input of the amplifier 28. The output of the error amplifier 28 is the difference between the two inputs to the error amplifier 28, and is multiplied by the gain of the error amplifier. This error voltage output by the error amplifier 28 is provided as a feedback signal to the pwm modulator 18 which adjusts the width of the pulse or modulator signal generated by the pwm modulator. The modulator signal adjusts the switching on and off time of the transistor 16 in order to modulate the regulator input signal, which in turn adjusts the average voltage level of the motor input signal after being smoothed by the filter circuit 22, in order to compensate for deviations in the motor input voltage level sensed by the feedback circuitry. The compensation thus tends to maintain the voltage level of the motor input signal constant despite changes in the voltage level of the regulator input signal or changes to the load in order that the rotational speed of the motor 12 remains relatively constant. As previously mentioned, a drawback with the prior art circuit is that the output filter inductor and capacitor 24, 26 are relatively bulky and therefore require considerable mounting space in the regulator circuitry. This large space requirement hampers the growing demand to incorporate brushless DC motors and regulator circuitry in ever smaller spaces, such as the relatively small spaces allotted for regulated DC cooling fan units within portable computers.

Figure 2:
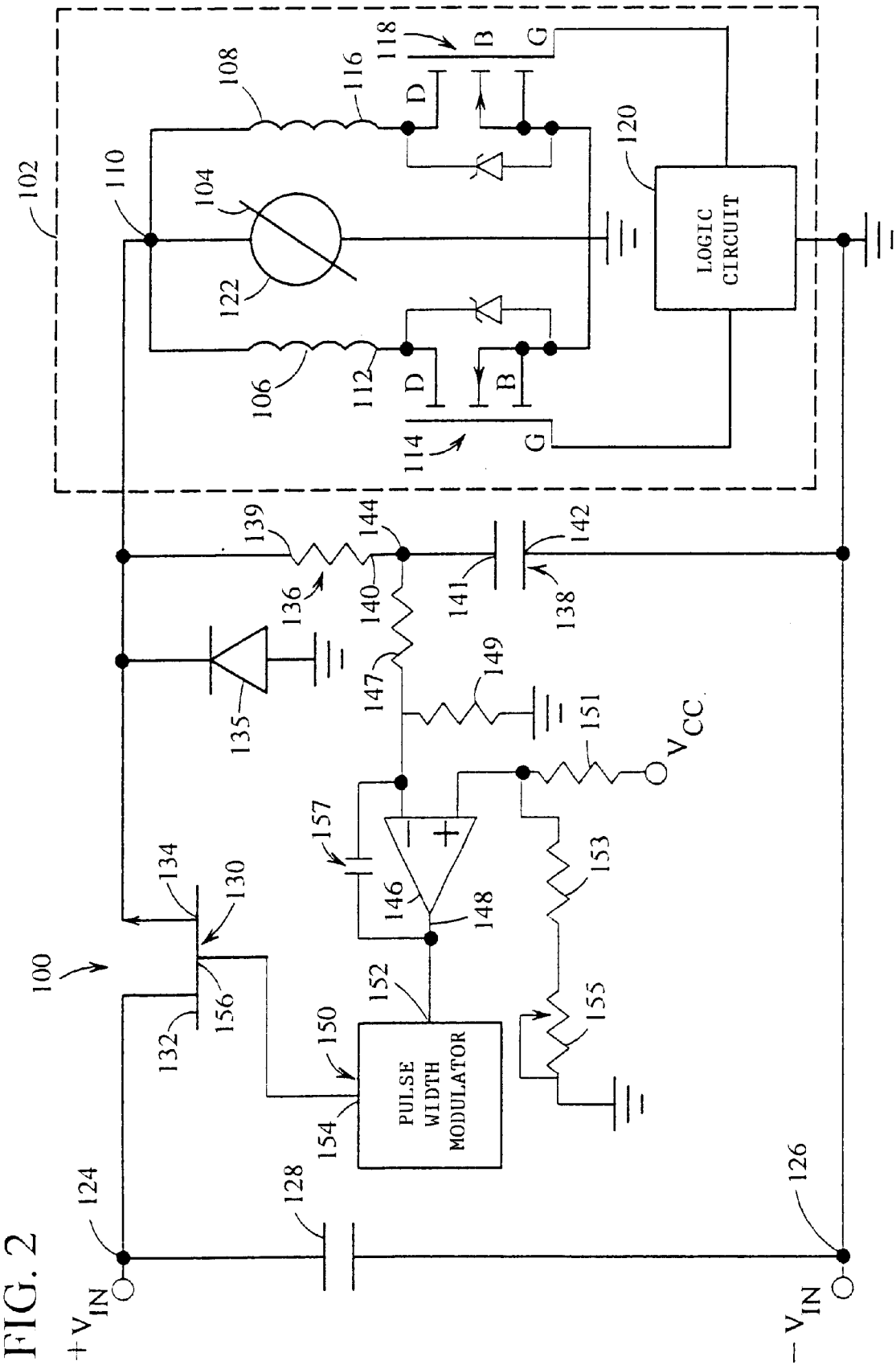
FIG. 2 illustrates schematically an electrical circuit of a pwm voltage regulator for a unipolar motor embodying the present invention which employs the brushless DC motor windings and rotor mass as a substitute for additional filter inductors and capacitors.

Turning now to FIG. 2, a pwm voltage regulator circuit 100 is employed in a center tap modulation approach for regulating the rotational speed of a brushless DC motor 102 enclosed by dashed lines. The motor 102 is a conventional brushless DC motor which may be coupled to a fan 104 used to cool a surrounding area such as the inside of a computer. The motor 102 includes first and second directional windings 106, 108, respectively. Each of the windings 106, 108 has a first end coupled to an input terminal or center tap 110 of the motor. A second end 112 of the first winding 106 is coupled to ground potential via a first commutation switching transistor 114, and a second end 116 of the second winding 108 is likewise coupled to ground via a second commutation switching transistor 118. The switching transistors 114, 118 are alternately turned on and off by means of a conventional commutator logic circuit 120. A rotor 122 is caused to rotate, and in turn rotate the fan 104 coupled thereto, by interacting with an electromagnetic field generated by commutated current flowing through the first and second windings 106,108.

The voltage regulator circuit 100 includes a positive input terminal 124 and a negative input terminal 126 for receiving thereacross a DC regulator input signal from a power source (not shown). An input capacitor 128 is coupled across the positive and negative input terminals 124 and 126. Means for switchably passing a motor supply signal to the brushless DC motor 102 includes, for example, a pwm power or switch or transistor 130, such as an npn bipolar junction transistor (BJT). The transistor 130 has its collector 132 coupled to the positive input terminal 124 and its emitter 134 coupled to an input voltage terminal of the motor 102 at 110. A catch diode 135 has its cathode coupled to the emitter 134 of the transistor 130 and its anode coupled to ground potential. Means for averaging the voltage of the motor supply signal includes a series connected resistor 136 and capacitor 138 which cooperate to form a voltage integrator. The resistor 136 and the capacitor 138 are coupled between the emitter 134 of the transistor 130 and the negative input terminal 126. More specifically, the resistor 136 has respective first and second terminals 139, 140, and the capacitor 138 has respective first and second terminals 141, 142. The first terminal 139 of the resistor 136 is coupled to the emitter 134 of the transistor 130. The second terminal 140 of the resistor 136 is coupled to the first terminal 141 of the capacitor 138 at a junction 144 where an averaged signal indicative of the average voltage level of the motor supply signal is generated, and the second terminal 142 of the capacitor 138 is coupled to the negative input terminal 126.

Means for generating a differential signal having a voltage level indicative of the difference between the voltage level of the averaged signal and a reference voltage includes a high gain operational or error amplifier 146, such as a differential voltage amplifier. The error amplifier 146 has its inverting input coupled to the junction 144 via a resistor 147. The gain of the error amplifier 146 is preferably selected so that only millivolts of difference between the inverting and non-inverting inputs will drive the amplifier output to its extreme. A resistor 149 is coupled between the inverting input of the error amplifier 146 and ground potential. The non-inverting input of the error amplifier 146, which is fed the reference voltage, is coupled to a voltage $V_{cc}$ via a resistor 151. The non-inverting input is also coupled to ground via a series connected resistor 153 and potentiometer 155. An output 148 of the error amplifier 146 is coupled to a pulse width modulator (pwm) 150 at an input 152. The pwm 150 is a means for turning on and off the transistor 130 to modulate the motor supply signal so that the motor supply signal is maintained at a substantially constant voltage level and, in turn, the motor 102 is maintained at a substantially constant rotational speed. A roll-off capacitor 157 is coupled between the inverting input and the output 148 of the error amplifier 146. An output 154 of the pwm 150 is coupled to a base 156 of the transistor 130.

Figure 3:
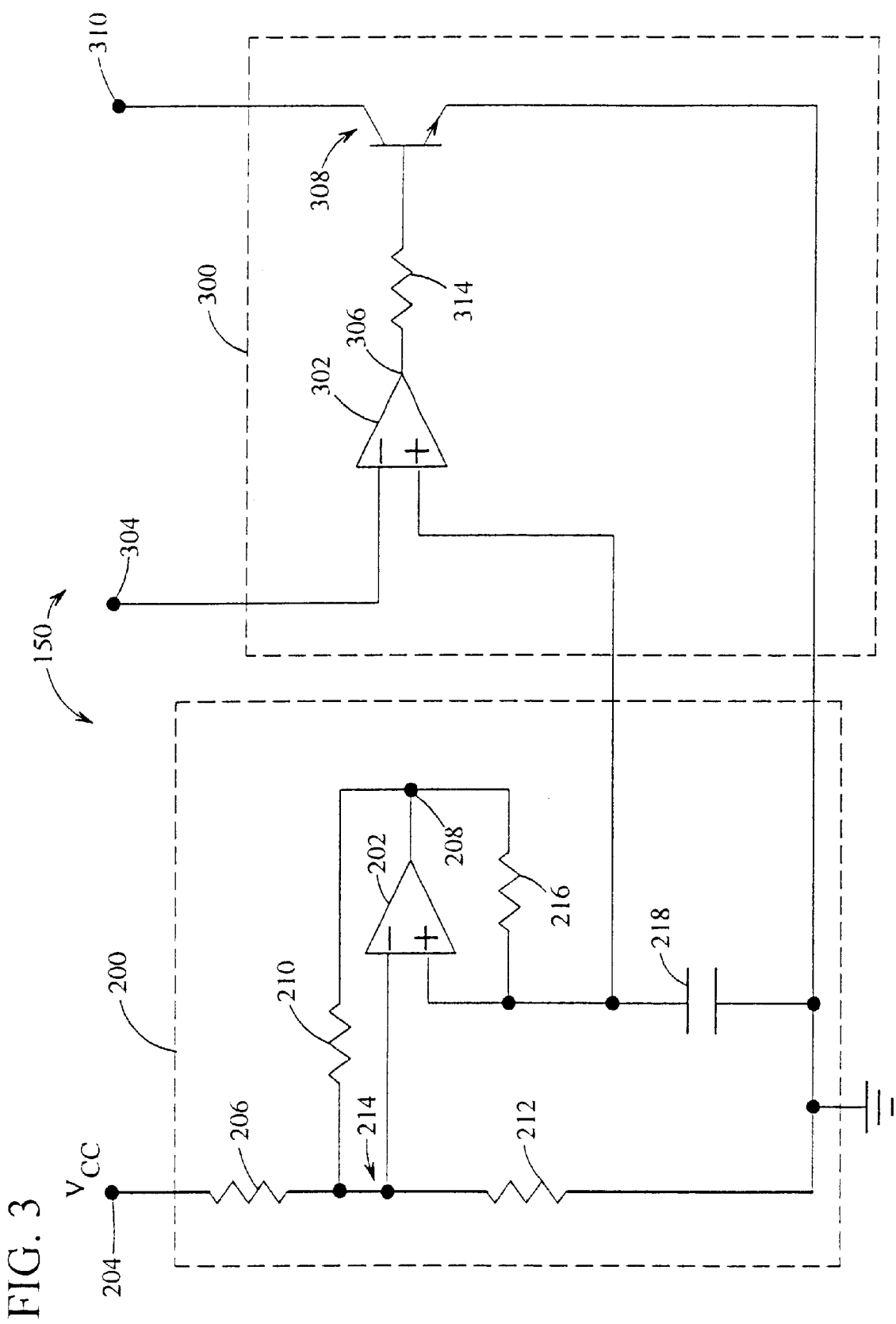
FIG. 3 illustrates schematically a pwm sub-circuit of the pwm voltage regulator of FIG. 2.

One preferred embodiment of the pulse width modulator 150 is illustrated in FIG. 3. The pwm 150 includes an oscillator sub-circuit 200 and a driver sub-circuit 300 each enclosed by dashed lines. The oscillator 200 includes a comparator 202 having its non-inverting input coupled to a $V_{cc}$ source at 204 via a resistor 206. An output 208 of the comparator 202 is coupled to its non-inverting input via a resistor 210. A resistor 212 is coupled between the non-inverting input of the comparator 202 and ground potential. The resistors 206, 210 and 212 are coupled to one another at a junction 214. A timing resistor 216 is coupled between the output 208 of the comparator 202 and the inverting input of the comparator. A timing capacitor 218 is coupled between the inverting input of the comparator 202 and ground potential.

The driver sub-circuit 300 includes a comparator 302 having its non-inverting input coupled to the inverting input of the comparator 202 of the oscillator sub-circuit 200. The inverting input of the comparator 302 at terminal 304 receives the error voltage signal from the output 148 of the error amplifier 146 shown in FIG. 2. An output 306 of the comparator 302 is coupled to a base of a transistor 308 via a resistor 314. The transistor 308, which serves as a pwm driver transistor, is shown as an npn BJT, but may be an FET or other suitable transistor for driving the pulse width modulator. An emitter of the transistor 308 is coupled to ground potential, and a collector of the transistor 308 is coupled at its output 310 to the base 156 of the power transistor 130 shown in FIG. 2.

Referring now to the operation of the pwm voltage regulator circuit 100 shown in FIG. 2, the regulator circuit 100 receives a DC regulator input signal across the positive and negative input terminals 124, 126 from a power source (not shown) such as a DC power supply or an AC source that is rectified into DC voltage. The DC regulator input signal is initially filtered by the input capacitor 128 to further smooth the input voltage signal and to remove any unwanted transient voltage fluctuations. The motor supply signal derived from the DC power supply is modulated by the combination of the pwm 150 and the transistor 130 to generate a motor supply signal having a predetermined average voltage level suitable for operating the motor 102 at a desired rotational speed. Because the rotational speed of the motor 102 is a function of the voltage level of the motor supply signal, it is important to maintain this voltage level at substantially the same value.

The pwm 150 sends a modulator signal to the base 156 of the switching transistor 130 to modulate the motor supply signal. The modulated motor supply signal present at the emitter 134 of the transistor 130 is the signal used to regulate the rotational speed of the motor 102. The voltage level of the modulated motor supply signal is averaged at the junction 144 by the series combination of the resistor 136 and the capacitor 138 to form an averaged signal, and is thus indicative of the average voltage level of the motor supply signal. The voltage level of the averaged signal is a function of the pulse width of the modulated motor supply signal.

The voltage level of this averaged signal at the junction 144 is reduced by the resistors 147, 149, and this reduced voltage level of the averaged signal is received at the inverting input of the error amplifier 146 and compared with a reference, such as $V_{ref}$, to generate a differential or error signal at the output 148 of the error amplifier 146. $V_{ref}$ is determined by the resistors 151, 153 and adjusted by the potentiometer 155. The reference voltage $V_{ref}$ is a fixed voltage level which is compared with the reduced voltage level of the averaged signal to determine if there is any deviation in the difference between the voltage level of $V_{ref}$ and the reduced voltage of the averaged signal representing the motor supply signal or voltage, and thus indicating a tendency for the rotational speed of the motor 102 to change or drift over changes in input voltage to the pwm voltage regulator circuit 100. As an example, the voltage level of the averaged signal $V_m$ is selected as 12.75 volts, $V_{ref}$ is 0.25 volt and the resistors 147, 149 are selected to reduce the voltage level of the averaged signal by a factor of 50 in order that $V_m$=((resistance of the resistor 147/resistance of the resistor 149)*$V_{ref}$)+$V_{ref}$=((50)*0.25)+0.25)=12.75 volts.

If there is a deviation between the ideal voltage $V_{ref}$ (i.e., 0.25 volt in this example) and that of the voltage level of the reduced averaged signal at the inverting input of the error amplifier 146, the error amplifier 146, in order to compensate for any change in the voltage level of the motor supply signal (i.e., a deviation from 12.75 volts in this example), will generate an error signal at the output 148 of the amplifier 146 having a voltage magnitude proportional to the difference between the voltage levels present at the inverting and non-inverting inputs of the amplifier 146. When the reduced voltage level of the averaged signal drops slightly in relation to $V_{ref}$ because of, for example, a load increase or input voltage drop, the voltage level of the amplifier signal generated at the output 148 of the amplifier 146 will increase slightly. The increased voltage level of the amplifier signal will then be fed to the input 152 of the pwm 150 to slightly increase the duration or pulse width of the modulator signal generated at the output 154 of the pwm 150.

The increased duration of the modulator signal is fed to the base 156 of the power transistor 130 to increase the pulse width or duration of the turn-on time of the transistor 130. The increased turn-on time thus increases the pulse width of the modulated motor supply signal present at the emitter 134 of the transistor 130 which is fed to the input voltage terminal 110 of the brushless DC motor 102. The increased duration or pulse width of the modulated motor supply signal raises the average voltage level of the motor supply signal, to compensate for the slight drop in the voltage level of the motor supply signal, thereby maintaining the rotational speed of the motor at a generally constant rpm. Conversely, if the reduced voltage level of the averaged signal increases slightly, the amplifier 146, the pwm 150 and the transistor 130 cooperate in a fashion opposite to that just described to decrease the pulse width of the motor supply signal for decreasing the average voltage level of the motor supply signal. The roll-off capacitor 157 is coupled across the error amplifier 146 to prevent the output of the error amplifier from slewing to its limits in response to $V_m$ changes by means of reducing the high frequency gain of the error amplifier 146 to the point that the pwm 150 can follow the error amplifier output. The catch diode 135 prevents the inductor current from decaying at a rapid rate and the voltage at the center tap 100 from falling below ground potential in order to maintain the average voltage at the center tap as the motor current is being commutated.

The pwm voltage regulator circuit just described is known to substantially maintain the rotational speed of a brushless DC motor over a wide range of motor supply voltages while also maintaining a symmetrical current waveform. An example of motor rotational speed and current as a function of motor supply voltage is set forth in Table 1.

TABLE 1

| Voltage | Speed (RPM) | Current (Amperes) |
|---------|-------------|-------------------|
| 19      | 3680        | 0.82              |
| 20      | 3180        | 0.86              |
| 21      | 3210        | 0.84              |
| 30      | 3230        | 0.61              |
| 48      | 3230        | 0.41              |
| 60      | 3230        | 0.35              |

As can be seen from Table 1, over a motor supply voltage range of 20 volts to 60 volts, the rotational speed of a brushless DC motor controlled by the regulator circuit of the present invention is maintained substantially constant (i.e., the rotational speed varies 1.5%) as compared with conventional motors. As also shown in the Table, the rotational speed of the motor shows no discernible fluctuation over a motor supply voltage range of 30 to 60 volts.

An advantage of employing the above-described voltage mode control for a brushless DC motor is that the control permits a high torque for starting the motor and a narrow speed for distribution range for tightly regulating the rotational speed of the motor over a large range of motor supply voltages. A further advantage of applying center tap modulation is that this type of modulation possesses the superior linear transfer characteristics found in full bridge modulation without certain drawbacks of full bridge modulation, including: the complexity of logic and sequencing of transistor switches, the possibility of cross conduction, and in turn, short circuiting across the input source, difficulty in sensing average motor coil voltage, sensing continuous motor current, and the high parts count inherent in employing full bridge modulation.

The operation of the pwm 150 of FIG. 2 will be explained more fully with reference to FIG. 3. Preferably, the resistors 206, 210 and 212 are selected to be of equal resistance. When the output of the comparator 202 is low, the junction 214 of the resistors 206, 210 and 212 is at ⅓ $V_{cc}$. When the output of the comparator 202 is high, the junction is at ⅔ $V_{cc}$. The timing capacitor 218 is charged and discharged between ⅓ $V_{cc}$ and ⅔ $V_{cc}$ by the timing resistor 216. The frequency of oscillation is primarily a function of the capacitance level of the timing capacitor 218 and the resistance level of the timing resistor 216, and the duty cycle is preferably about 50%. A ramp voltage generated by the timing resistor 216 and the timing capacitor 218 is applied to the non-inverting input of the comparator 302 of the driver sub-circuit 300. When the collector of the driver transistor 308 is low, the pwm switch transistor 130, shown in FIG. 2, is off or non-conducting, and the center tap 110 of the motor 102 is at 0 volts. When the collector of the driver transistor 308 is high, then the pwm switch transistor 130 is on or conducting, and the center tap 110 of the motor 102 is coupled to $V_{in}$.

As can be seen in FIG. 2, there is no filter circuit external of the motor 102 for smoothing the voltage level of the motor supply signal in order to maintain the rotational speed of the motor 102 at a generally constant rpm. The regulator 100 uses the windings 106, 108 of the motor 102 to integrate the pwm voltage and to function similarly to the filter inductor 24 of FIG. 1, and changes in current drawn by the motor 102 are smoothed (i.e., the rotational speed of the motor is maintained substantially constant) by the mass of the rotor 122 in a similar way as the filter capacitor 26 of FIG. 1 smoothes the voltage level of the motor input signal. In other words, the motor inductance is substituted for the filter inductor 24 of FIG. 1, and the rotor mass or inertia is substituted for the filter capacitor 26 of FIG. 1. Thus, the bulky filter inductor 24 and the filter capacitor 26 of FIG. 1 are eliminated in the embodiment of FIG. 2. As a result, the regulator 100 consumes considerably less space than did prior regulators using bulky filter inductors and capacitors. Further, a regulated DC motor or DC fan unit that includes the regulator circuit embodying the present invention also consumes less space because of the elimination of the additional bulky filter components. Accordingly, the regulator circuit 100, or a DC motor or DC fan unit incorporating the regulator embodying the present invention overcomes the space constraints that are found in the prior DC motors or DC fan units using additional filter components.

Figure 4:
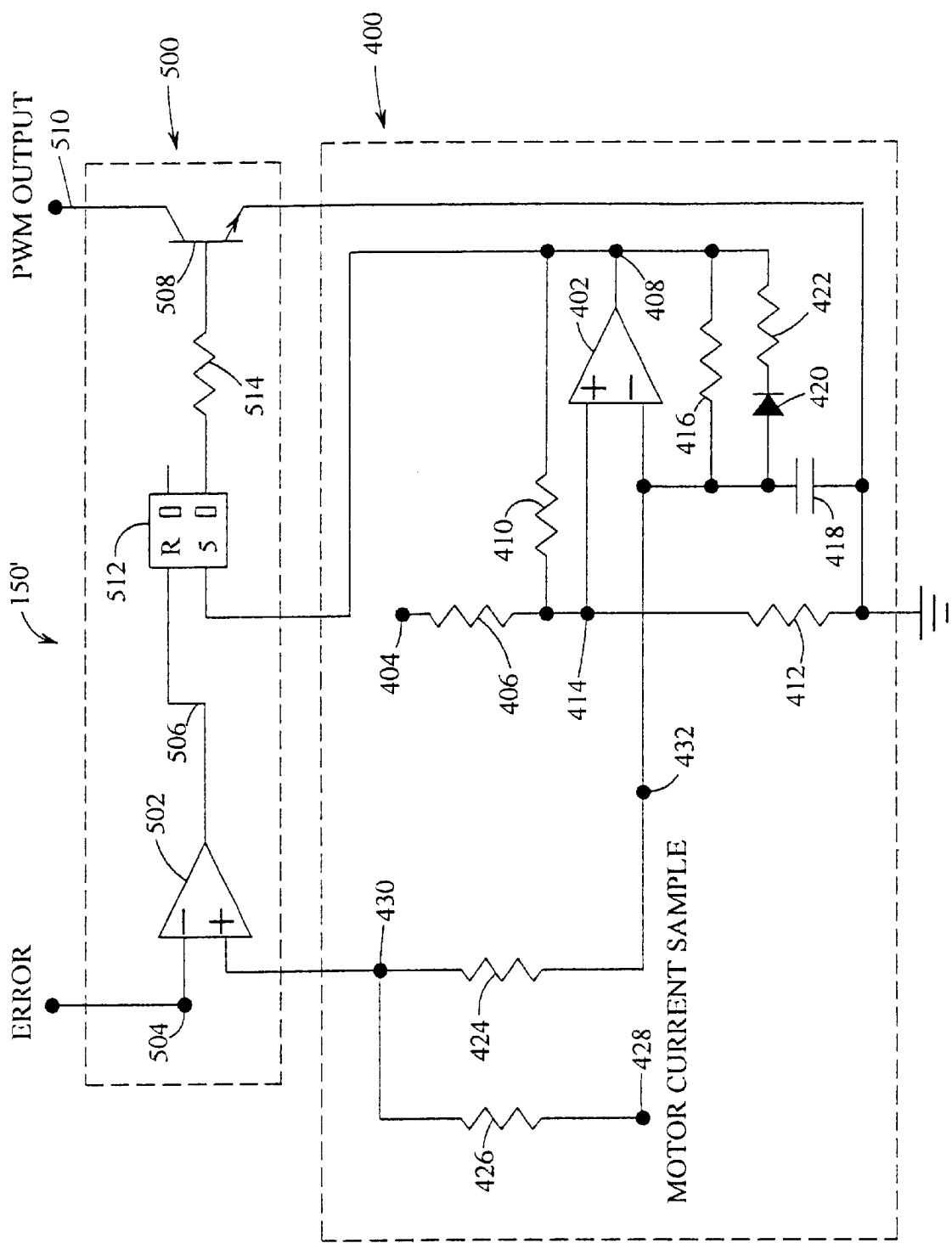
FIG. 4 illustrates schematically an alternative current compensating pwm sub-circuit embodying the present invention and which may form a part of the pwm voltage regulator of FIG. 2.

Turning to FIG. 4, another preferred embodiment of the pulse width modulator is indicated generally by the reference numeral 150'. The pwm 150' includes a periodic sub-circuit 400 and a driver sub-circuit 500 each enclosed by dashed lines. The periodic sub-circuit 400 comprises a periodic signal generator in the form of an oscillator comprising a comparator 402 and related circuit components. The comparator 402 has its non-inverting input coupled to a $V_{cc}$ source at 404 via a resistor 406. An output 408 of the comparator 402 is coupled to its non-inverting input via a resistor 410. A resistor 412 is coupled between the non-inverting input of the comparator 402 and ground potential. The resistors 406, 410 and 412 are coupled to one another at a junction 414. A timing resistor 422 is coupled between the output 408 of the comparator 402 and the cathode end of a diode 420. The anode end of the diode 420 is coupled to the inverting input of the comparator 402. A timing resistor 416 is coupled between the output 408 and the inverting input of the comparator 402. A timing capacitor 418 is coupled between the inverting input of the comparator 402 and ground potential. A resistor 424 is coupled between the inverting input of the comparator 402 and a summing junction 430. As described in further detail below, the periodic signal generator transmits a ramp signal to the junction 432 defining a sawtooth waveform. However, as may be recognized by those skilled in the pertinent art based on the teachings herein, the periodic signal generator may generate any of numerous different periodic or ramp signals suitable for performing the functions described herein. Similarly, the periodic signal generator may take any of numerous different configurations which now or later become known to those skilled in the pertinent art for performing the functions of the periodic signal generator described herein.

Means for receiving a motor current sample signal are provided by an input terminal 428. The input terminal 428 may be coupled, for example, to the common source terminal of the motor MOSFETs of FIG. 2. However, as may be recognized by those skilled in the pertinent art based on the teachings herein, the input terminal 428 may be coupled to any of numerous other motor current sources for generating the motor current signal described herein. A resistor 426 is coupled between the input terminal 428 and the summing junction 430. Accordingly, the summing junction 430 provides a signal indicative of the sum of the periodic or ramp signal received from junction 432 and the motor current signal received from the input terminal 428.

The driver sub-circuit 500 includes a comparator 502 having its non-inverting input coupled to the summing junction 430 of the periodic sub-circuit 400. The inverting input of the comparator 502 receives at terminal 504 the error voltage signal from the output 148 of the error amplifier 146 of FIG. 2. An output 506 of the comparator 502 is coupled to a Reset input of an RS flip-flop 512. The Set input of flip-flop 512 is coupled to the output 408 of the periodic sub-circuit 400. The inverting output of the flip-flop 512 is coupled through a resistor 514 to the base of a transistor 508. An emitter of the transistor 508 is coupled to ground potential, and a collector of the transistor 508 is coupled at its output 510 to the base 156 of the power transistor 130 of FIG. 2. The transistor 508, which serves as a pwm driver transistor, is shown as an npn BJT, but may be an FET or other suitable transistor or other electrical conduction switch for driving the pulse width modulator of the invention. Similarly, as may be recognized by those skilled in the pertinent art based on the teachings herein, the flip-flop 512 may take the form of any of numerous binary state or like devices which now or later become known to those skilled in the pertinent art for performing the functions of the flip-flop described herein.

The resistors 406, 410 and 412 may be selected to be of equal resistance. Accordingly, when the output of the comparator 402 is low, the junction 414 of the resistors 406, 410 and 412 is at ⅓ $V_{cc}$. When the output of the comparator 402 is high, the junction 414 is at ⅔ $V_{cc}$. The timing capacitor 418 is periodically charged from ⅓ $V_{cc}$ to ⅔ $V_{cc}$ by the timing resistor 416. The timing capacitor 418 is periodically discharged from ⅔ $V_{cc}$ to ⅓ $V_{cc}$ by the timing resistor 422 through diode 420. The frequency of oscillation is primarily a function of the capacitance level of the timing capacitor 418 and the resistance levels of the timing resistors 416 and 422. Timing resistor 416 determines the charge period, and the equivalent resistance of parallel resistors 416 and 422 determines the discharge period. Accordingly, a ramp voltage generated by the timing resistor 416 and the timing capacitor 418 is applied to the junction 432 and, in turn, to the summing junction 430. Input terminal 428 passes a motor current signal across resistor 426 to summing junction 430. Thus, the resultant signal at the summing junction 430 is approximately equal to the sum of the ramp signal and the motor current signal, and the summed signal is coupled to the non-inverting input of the comparator 502 of the driver sub-circuit 500. The output terminal 506 of the comparator 502 is coupled to the Reset input of flip-flop 512, thereby causing the flip-flop 512 to Reset whenever the value of the motor current plus ramp from the summing junction 430 exceeds the value of the error signal from the input terminal 504 as applied to the inverting input of the comparator 502. The Set input of the flip-flop 512, on the other hand, is activated every time the output 408 of the comparator 402 goes low, thereby activating the inverted output of flip-flop 512 at the start of each ramp cycle coinciding with the ramp signal received at the summing junction 430 across the resistor 424. Once activated, the inverted output of the flip-flop 512 drives the collector of the driver transistor 508 high. When the collector of the driver transistor 508 is low, the pwm switch transistor 130 of FIG. 2 is off or non-conducting, and the center tap 110 of the motor 102 is at approximately 0 volts. When the collector of the driver transistor 508 is high, then the pwm switch transistor 130 is on or conducting, and the center tap 110 of the motor 102 is coupled to $V_{in}$ in FIG. 2. As may be recognized by those skilled in the pertinent art based on the teachings herein, the periodic signal generator may generate any of numerous different periodic or ramp signals suitable for performing the functions described herein.

FIG. 5A depicts a typical prior art pwm voltage regulator motor current waveform resulting when motor commutation happens to be ideal. As can be seen, the waveform is symmetrical from pulse to pulse, but non-symmetrical within each pulse. More frequently however, prior art motors will exhibit non-ideal commutation with a resultant motor current waveform such as that depicted in FIG. 5B. The waveform of FIG. 5B is non-symmetrical from pulse to pulse in addition to being non-symmetrical within each pulse. One advantage of the present invention is that a symmetrical motor current waveform, such as that depicted in FIG. 5C, is attainable via application of the present invention to brushless DC motors such as those used in the prior art.

In the operation of the apparatus and method of the invention, the motor is powered by the voltage pulses passing across the pwm switch transistor 130 of FIG. 2 only when the output 510 of the transistor 508 is activated. The transistor 508 is activated periodically when the output 408 of the comparator 402 goes low, such activations corresponding to the start of a periodic sawtooth or other ramp signal generated by the oscillator or other periodic signal generator. The output 510 is effectively deactivated whenever the sum of the ramp signal at 432 and the motor current signal at 428 exceed the value of the error voltage 504 corresponding to the difference between motor actual speed and desired speed. Thus, motor speed is primarily controlled by the circuit of FIG. 2, while motor current is primarily controlled by the sub-circuit 400 of FIG. 4. The result is accurate motor speed control accompanied by symmetrical motor current waveforms, such as depicted in FIG. 5C. A further advantage of the symmetrical motor current waveform of the present invention is that it may have attendant acoustical benefits when realized in a fan motor controller for lower inertia fan assemblies.

Figure 6:
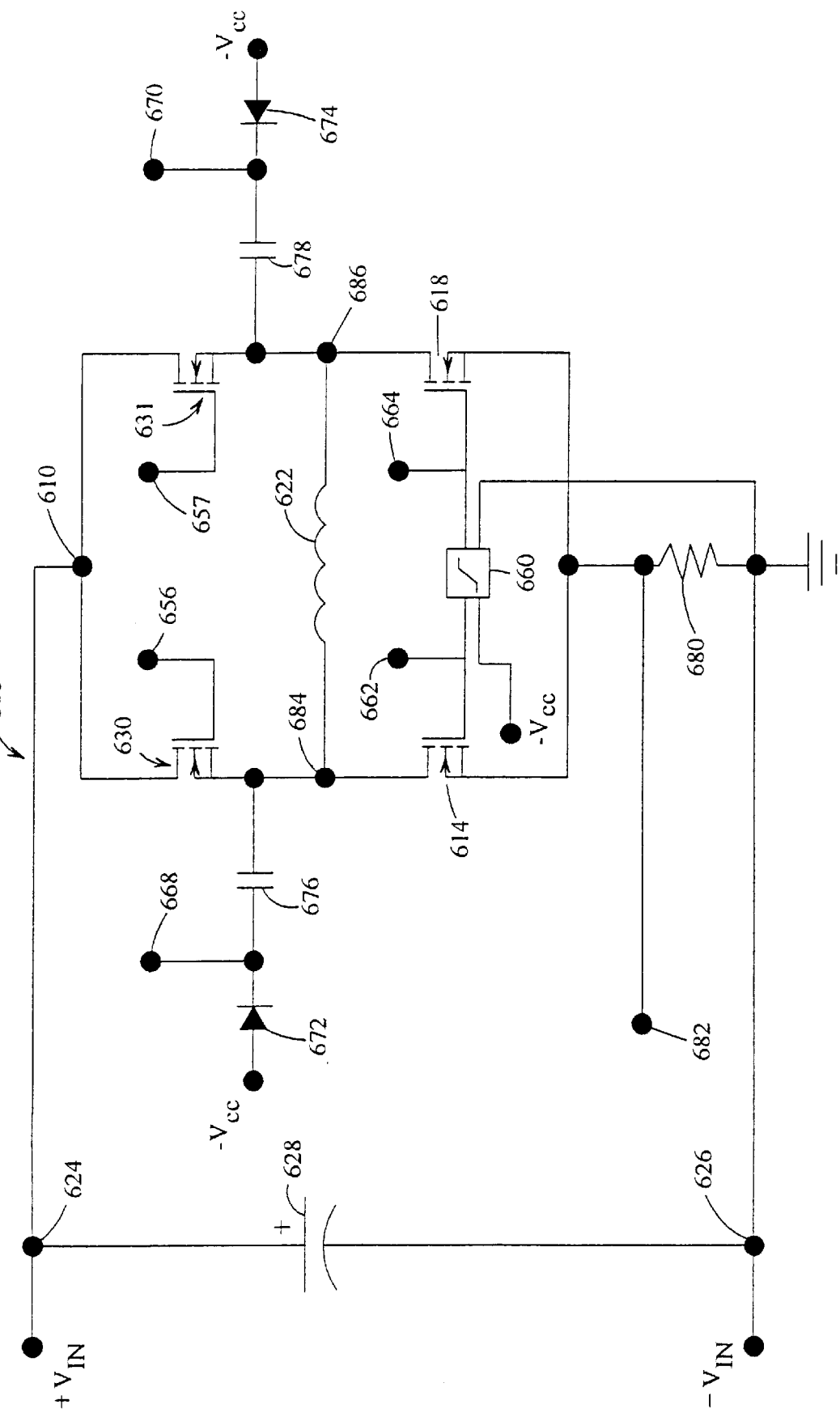
FIG. 6 illustrates schematically an electrical circuit of a pwm voltage regulator for a bipolar motor embodying the present invention and which also employs the brushless DC motor windings and rotor mass as a substitute for additional filter inductors and capacitors.

Turning now to FIG. 6, a pwm voltage regulator circuit 600 embodying the invention is employed in an H-bridge modulation approach for regulating the rotational speed of a bipolar brushless DC motor winding 622. The motor is a conventional brushless DC motor which may be coupled to a fan used to cool a surrounding area such as the inside of a computer.

The voltage regulator circuit 600 includes a positive input terminal 624 and a negative input terminal 626 for receiving thereacross a DC regulator input signal from a power source (not shown). An input capacitor 628 is coupled across the positive and negative input terminals 624 and 626. Means for switchably passing a motor supply signal to a brushless DC motor winding 622 includes, for example, a first pwm switch or transistor 630, and a second pwm switch or transistor 631, such as the N-channel MOSFETs illustrated. The transistor 630 has its drain coupled to the positive input terminal 624 via junction terminal 610, its source coupled to an input voltage terminal of the motor winding 622 at terminal 684, and its gate coupled to a first pwm driver terminal 656. The transistor 631 has its drain coupled to the positive input terminal 624 via junction terminal 610, its source coupled to an input voltage terminal of the motor winding 622 at terminal 686, and its gate coupled to a second pwm driver terminal 657.

The motor winding 622 has a first end coupled to a first input terminal 684, and a second end coupled to a second input terminal 686. The first input terminal 684 is alternately connected to ground potential via a first commutation switching transistor 614, and the second input terminal 686 is likewise alternately connected to ground potential via a second commutation switching transistor 618. The switching transistors 614, 618 are alternately turned on and off by means of a Hall Effect sensor 660. The Hall Effect sensor 660 is coupled to a first output terminal 662 and a second output terminal 664. Output terminal 662 is coupled to the gate of a commutation transistor 614, which has its drain coupled to motor input terminal 684. Output terminal 664 is coupled to the gate of a commutation transistor 618, which has its drain coupled to motor input terminal 686. The source terminals of commutation transistors 614 and 618 are coupled together and then coupled to motor current sample terminal 682. Terminal 682 is dropped across resistor 680 to negative input terminal 626, which is coupled to ground potential. Negative $V_{CC}$ potential is coupled to the anode of a diode 672, the cathode of which is connected to driver power terminal 668. Terminal 668 is coupled to bootstrap capacitor 676 which is then coupled to motor input terminal 684. Negative $V_{CC}$ potential is also coupled to the anode of a diode 674, the cathode of which is connected to driver power terminal 670. Terminal 670 is coupled to bootstrap capacitor 678 which is then coupled to motor input terminal 686. The motor winding 622 is caused to rotate by interacting with an electromagnetic field generated by commutated current flowing therethrough.

Figure 7:
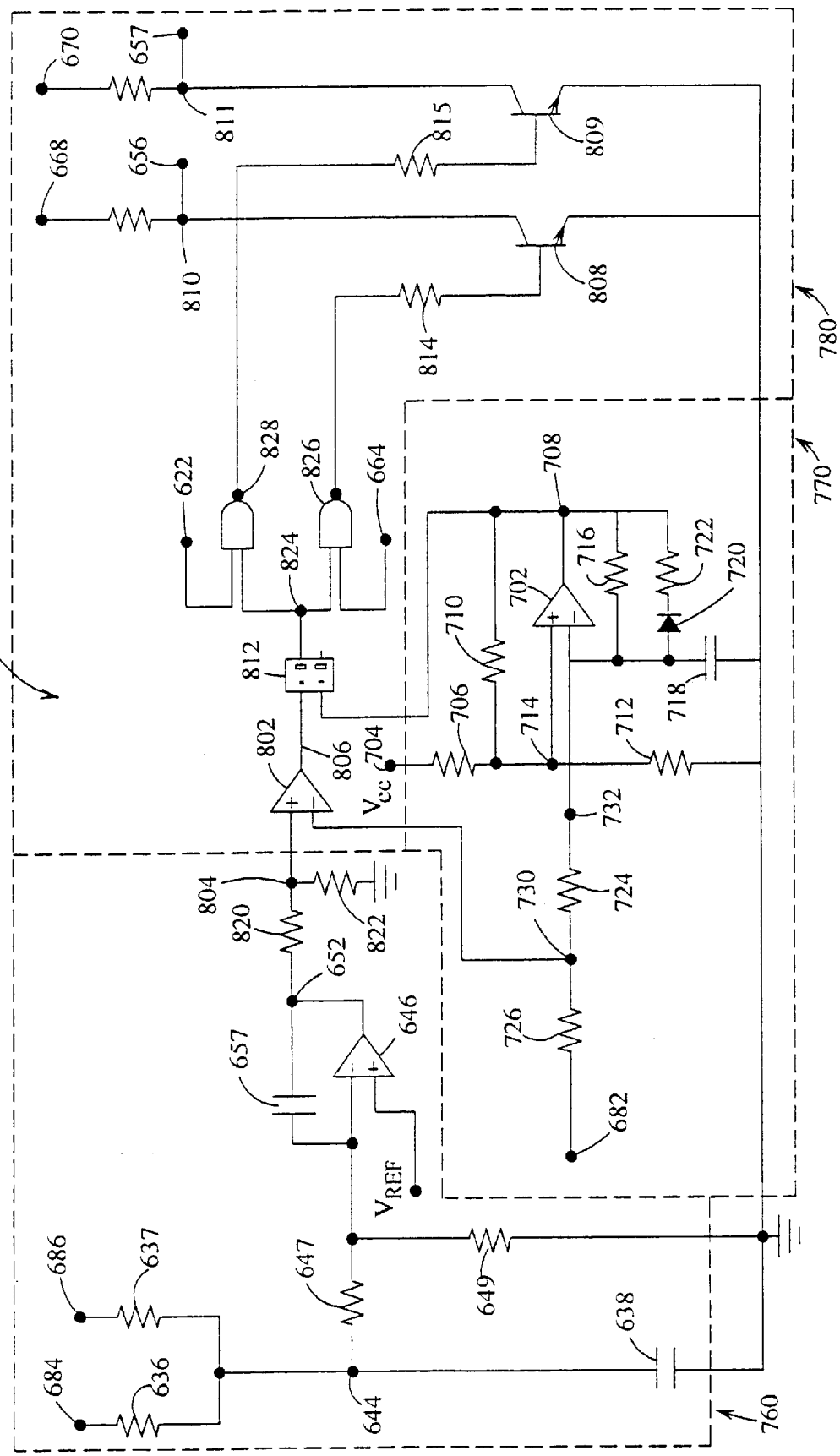
FIG. 7 illustrates schematically a current compensating pwm control circuit embodying the present invention for the pwm voltage regulator of FIG. 6.

Turning to FIG. 7, a preferred embodiment of the pulse width modulator for a bipolar motor is indicated generally by the reference numeral 650. The pwm 650 includes a voltage sub-circuit 760, a periodic sub-circuit 770, and a driver sub-circuit 780 each enclosed by dashed lines.

The voltage sub-circuit 760 comprises means for averaging the voltage of the motor supply signal including series connected resistors 636 and 637, and an averaging capacitor 638 which cooperate to form a voltage averaging circuit. The resistor 636 is coupled between motor winding terminal 684 and terminal 644, and the resistor 637 is coupled between motor winding terminal 686 and junction 644. The averaging capacitor 638 is then coupled between junction 644 and ground potential. A first voltage dividing resistor 647 is coupled between junction 644 and the inverting input of an error amplifier 646. A second voltage dividing resistor 649 is coupled between the inverting input of the error amplifier 646 and ground potential. The non-inverting input to the error amplifier 646 is coupled to a reference voltage $V_{REF}$. The output of the error amplifier 646 is coupled to a voltage error terminal 652. A capacitor 657 is coupled between the terminal 652 and the inverting input to the error amplifier 646. A resistor 820 is coupled between terminal 652 and terminal 804. A resistor 822 is coupled between terminal 804 and ground.

Means for generating a differential signal at terminal 652 having a voltage level indicative of the difference between the voltage level of the averaged signal and a reference voltage includes the high gain operational or error amplifier 646, which in the preferred embodiment of the present invention is a differential voltage amplifier. The error amplifier 646 has its inverting input coupled to the junction 644 via a resistor 647. The gain of the error amplifier 646 is preferably selected so that only millivolts of difference between the inverting and non-inverting inputs will drive the amplifier output to its extreme. A resistor 649 is coupled between the inverting input of the error amplifier 646 and ground potential. The non-inverting input of the error amplifier 646 is fed the reference voltage $V_{REF}$. An output terminal 652 of the error amplifier 646 is coupled to the driver sub-circuit 780 at terminal 804. The pwm 650 provides a means for turning on and off the pwm switching transistors 630 and 631 of FIG. 6 to modulate the motor supply signal so that the motor supply signal is maintained at a substantially constant voltage level and, in turn, the motor winding 622 is maintained at a substantially constant rotational speed. A roll-off capacitor 657 is coupled between the inverting input and the output of the error amplifier 646.

The periodic sub-circuit 770 comprises a periodic signal generator in the form of an oscillator comprising a comparator 702 and related circuit components. The comparator 702 has its non-inverting input coupled to a $V_{cc}$ source at 704 via a resistor 706. An output 708 of the comparator 702 is coupled to its non-inverting input via a resistor 710. A resistor 712 is coupled between the non-inverting input of the comparator 702 and ground potential. The resistors 706, 710 and 712 are coupled to one another at a junction 714. A timing resistor 722 is coupled between the output 708 of the comparator 702 and the cathode end of a diode 720. The anode end of the diode 720 is coupled to the inverting input of the comparator 702. A timing resistor 716 is coupled between the output 708 and the inverting input of the comparator 702. A timing capacitor 718 is coupled between the inverting input of the comparator 702 and ground potential. A resistor 724 is coupled between the inverting input of the comparator 702 and a summing junction 730. As described in further detail below, the periodic signal generator transmits a ramp signal to the junction 732 defining a sawtooth waveform. However, as may be recognized by those skilled in the pertinent art based on the teachings herein, the periodic signal generator may generate any of numerous different periodic or ramp signals suitable for performing the functions described herein. Similarly, the periodic signal generator may take any of numerous different configurations which now or later become known to those skilled in the pertinent art for performing the functions of the periodic signal generator described herein.

Means for receiving a motor current sample signal are provided by an input terminal 682. The input terminal 682 may be coupled, for example, to the source terminals of the commutation switch MOSFETs of FIG. 6. However, as may be recognized by those skilled in the pertinent art based on the teachings herein, the input terminal 682 for receiving the motor current input signal may be coupled to any of numerous other motor current sources for generating the motor current signal described herein. A resistor 726 is coupled between the input terminal 682 and the summing junction 730. Accordingly, the summing junction 730 provides a signal indicative of the sum of the periodic or ramp signal received from junction 732 and the motor current signal received from the input terminal 682.

The driver sub-circuit 780 includes a comparator 802 having its inverting input coupled to the summing junction 730 of the periodic sub-circuit 770. The non-inverting input of the comparator 802 receives at terminal 804 the error voltage signal from the output 652 of the error amplifier 646 of FIG. 6. An output 806 of the comparator 802 is coupled to a Reset input of an RS flip-flop 812. The Set input of flip-flop 812 is coupled to the output 708 of the periodic sub-circuit 700. The non-inverting output of the flip-flop 812 is coupled to junction 824. NAND gate 826 receives inputs from junction 824 and Hall output terminal 664, and has its output coupled through a resistor 814 to the base of a transistor 808. An emitter of the transistor 808 is coupled to ground potential, and a collector of the transistor 808 is coupled at its output 810 to the input 656 of the power transistor 630 of FIG. 6. NAND gate 828 receives inputs from junction 824 and Hall output terminal 662, and has its output coupled through a resistor 815 to the base of a transistor 809. An emitter of the transistor 809 is coupled to ground potential, and a collector of the transistor 809 is coupled at its output 811 to the input 657 of the power transistor 630 of FIG. 6. The transistors 808 and 809, which serve as pwm driver transistors, are shown as npn BJTs, but may be FETs or other suitable transistors or other electrical conduction switches for driving the pulse width modulators of the invention. Similarly, as may be recognized by those skilled in the pertinent art based on the teachings herein, the flip-flop 812 may take the form of any of numerous binary state or like devices which now or later become known to those skilled in the pertinent art for performing the functions of the flip-flop described herein.

When the output of the comparator 702 is low, the junction 714 of the resistors 706, 710 and 712 may be at ⅓ $V_{cc}$. When the output of the comparator 702 is high, the junction 714 may be at ⅔ $V_{cc}$. The timing capacitor 718 is periodically charged, for example, from ⅓ $V_{cc}$ to ⅔ $V_{cc}$ by the timing resistor 716. The timing capacitor 718 is periodically discharged from ⅔ $V_{cc}$ to ⅓ $V_{cc}$ by the timing resistor 722 through diode 720. The frequency of oscillation is primarily a function of the capacitance level of the timing capacitor 718 and the resistance levels of the timing resistors 716 and 722. Timing resistor 716 determines the charge period, and the equivalent resistance of parallel resistors 716 and 722 determines the discharge period. Accordingly, a ramp voltage generated by the timing resistor 716 and the timing capacitor 718 is applied to the junction 732 and, in turn, to the summing junction 730. Input terminal 682 passes a motor current signal across resistor 726 to summing junction 730. Thus, the resultant signal at the summing junction 730 is approximately equal to the sum of the ramp signal and the motor current signal, and the summed signal is coupled to the non-inverting input of the comparator 802 of the driver sub-circuit 780. The output terminal 806 of the comparator 802 is coupled to the Reset input of the flip-flop 812, thereby causing the flip-flop 812 to Reset whenever the value of the motor current plus ramp from the summing junction 730 exceeds the value of the error signal from the input terminal 804 as applied to the inverting input of the comparator 802. The Set input of the flip-flop 812, on the other hand, is activated every time the output 708 of the comparator 702 goes low, thereby activating the inverted output of flip-flop 812 at the start of each ramp cycle coinciding with the ramp signal received at the summing junction 730 across the resistor 724. Once activated, the non-inverted output of the flip-flop 812 drives the collector of one of the driver transistors 808 or 809 high. When the collector of the driver transistor 808 is low, the pwm switch transistor 630 of FIG. 6 is conducting to low potential. When the collector of the driver transistor 808 is high, then the pwm switch transistor 630 is conducting from high potential. Likewise, when the collector of the driver transistor 809 is low, the pwm switch transistor 631 of FIG. 6 is conducting to low potential. When the collector of the driver transistor 809 is high, then the pwm switch transistor 631 is conducting from high potential.

As may be recognized by those skilled in the pertinent art based on the teachings herein, the periodic signal generator may generate any of numerous different periodic or ramp signals suitable for performing the functions described herein.

Referring now to the method of operation of the pwm voltage regulator circuit 600 shown in FIG. 6, the two lower MOSFETs 614 and 618 are energized in response to the Hall Effect Sensor 660, which provides two outputs 662 and 664 that are out of phase with each other. As may be reconfigured by those skilled in the pertinent art based on the teachings herein, this function also could be performed by a single output Hall Switch with an inverting buffer, a Hall element with suitable amplifier, or some other type of position sensor such as an opto/electric sensor. The purpose being to activate the associated transistor switch. Here, outputs are shown that are used to gate the PWM switches 630 and 631. Alternatively, the output of the position sensor could be used to gate the synchronous switching of lateral pairs for greater power efficiency.

The direction of the current in the motor winding 622 is determined by the appropriate activation of opposing transistor pairs 614 and 631, or 618 and 630. For example, when PWM Switch 630 and Commutation Switch 618 are "ON", then one might say that the motor winding is energized "+ to –." When the opposite case occurs where PWM Switch 631 and Commutation Switch 614 are "ON", the winding would be energized "– to +." By repeating this sequence the motor is caused to rotate, and by the reversing of the current the motor is caused to be a bipolar motor.

Motor current is dropped across the resistor 680 to produce a small voltage at terminal 682 that is used to detect the amplitude of the motor current. This voltage representing the motor current is to be used in the course of regulating the motor current during normal and fault conditions. The MOSFETs 614, 618, 630 and 631 are N-channel types but could, by appropriate circuit design, be a mixture of P-channel and N-Channel types or some other type of solid state devices such as bipolar transistors or IBGTs.

For the power circuits to function properly in this embodiment a bias source of sufficient amplitude, about 10 volts higher than +Vin, must be provided to the upper side PWM switches 630 and 631. This is accomplished with the use of bootstrap drivers comprising the bootstrap capacitors 676 and 678, and the rectifier diodes 672 and 674. When the PWM switch 630 or 631 is "OFF", then that PWM switch Source lead which has a common connection with the bootstrap capacitor 676 or 678 is at approximately ground potential. The other end of the bootstrap capacitor is connected to –Vcc through the associated rectifier 672 or 674. When the PWM switch 630 or 631 is "ON", the PWM Switch Drain and Source are both at nearly Vin potential. The bootstrap capacitor 676 or 678 which was charged to Vcc is now at Vcc+Vin. This provides the necessary voltage to energize the PWM Switch 630 or 631.

With reference to FIG. 7, the oscillator is composed of the comparator 702, the resistor divider network comprising resistors 706, 710 and 712, and a time constant network. The values of the resistors 706, 710 and 712 determine the oscillator ramp levels at terminal 732 which for a 10-volt Vcc could be around 2 volts for a ramp voltage valley and around 7 volts for a ramp voltage peak.

The relative ratios for the charging resistor 716 and the discharging resistor 722 could be approximately 50:1. Ramp signal frequency is then determined primarily by charging resistor 716 and timing capacitor 718 and could be in the area of 20 kHz. The ramp signal from terminal 732 is summed at summing junction 730 with the Motor Current Sample from terminal 682 and applied to the inverting input of the second comparator 802.

In order to accurately maintain motor speed over a variety of input voltages $V_{IN}$ and to minimize the variation between production motors it is desirable to use a voltage control loop. A constant voltage drive is believed to maintain motor speed better than a constant current drive over different load conditions, such as back pressure variations or air density differences, because the motor is allowed to draw more current and therefore do more or less work as required. Constant voltage drive also results in less speed variation from motor to motor under equal loading conditions because variations from motor to motor are expressed as differences in input current for each individual motor. A well designed constant current drive can, however, result in less current variation within the rotational period of the motor.

By imbedding a current control loop within a voltage control loop in accordance with the invention optimal characteristics can be obtained. In other words, the voltage loop maintains a more equal speed over varying load conditions and minimizes speed deviations between different motors, and the current loop maintains a substantially constant current within the rotational period.

To accomplish the voltage control the present invention compares the motor voltage against a reference level. This is done by differential amplifier 646 that has the non-inverting terminal connected to a reference voltage. For the purpose of example that reference could be 0.25 volts. The motor voltage is derived with an averaging capacitor 638 and two resistors 636 and 637 attached to either end of the motor winding. The voltage on the capacitor 638 is equal to about ½ of the actual motor voltage. The divider network comprised of resistors 647 and 649 then scales that averaged voltage to be equal to the same 0.25 volts on the inverting terminal of the differential amplifier at the desired real motor voltage level.

The gain of the amplifier 646 is very high such that typically less than 1 mv of difference between inputs will result in several volts of change in the output. This output voltage, referred to as the Error voltage, is in turn applied to the non-inverting input of a comparator through divider resistors 820 and 822. This is to scale the full output voltage of the operational amplifier (646–842) to about 0.3 volts for 7.5 volts on the output 806 of the amplifier 802.

The motor current sample at terminal 682, which has a level of about 0.2 volts for full load operation, is summed at junction 730 with a portion of the ramp obtained from the oscillator and applied to the inverting input of the comparator 802. This causes the output of the comparator to go "LOW" when the instantaneous value of the motor sample plus ramp exceeds the voltage level set by the Error amplifier 802.

The output of the oscillator comparator 702 is "LOW" when the oscillator timing capacitor 718 is discharged, and this is connected to the "Set" input of flip-flop 812 so as to "Set" the flip-flop at the end of each oscillator cycle. The output of the comparator 802, which compares the current sample to the Error voltage, is connected to the Reset input of the flip-flop 812. The "Q" output of the flip flop 812 will then be "HIGH" when the oscillator starts the timing cycle, and will go "LOW" when the current sample exceeds a level determined by the voltage error amplifier 802.

The output or the flip-flop 812 is then applied to the inputs of two NAND gates 826 and 828 that also receive inputs from the Hall Effect Switch 660. The NAND gates route the flip flop output to the appropriate drive transistor 808–809 according to the motor position as sensed by the Hall Effect Switch 660, which in turn enables the appropriate PWM MOSFET 630 or 631. Accordingly, the comparator 802 controls the current in the motor by affecting interruption of current flow through the PWM MOSFETs 630 or 631. This occurs when the current exceeds a level set by the Voltage Error amplifier 646. The amplitude of the motor current is determined by comparing the motor voltage against a desired value but nevertheless will remain substantially constant over the rotation period.

FIGS. 8A and 9A depict typical prior art pwm voltage regulator motor input current waveforms resulting at motor speeds of about 2000 and 3500 RPM respectively. As can be seen, the input waveforms are non-symmetrical within each pulse and non-symmetrical between cycles. One advantage of the present invention is that substantially symmetrical motor input current waveforms, such as those depicted in FIGS. 8B and 9B, are attainable via application of the present invention to brushless DC motors such as those used in the prior art.

Figure 11A:
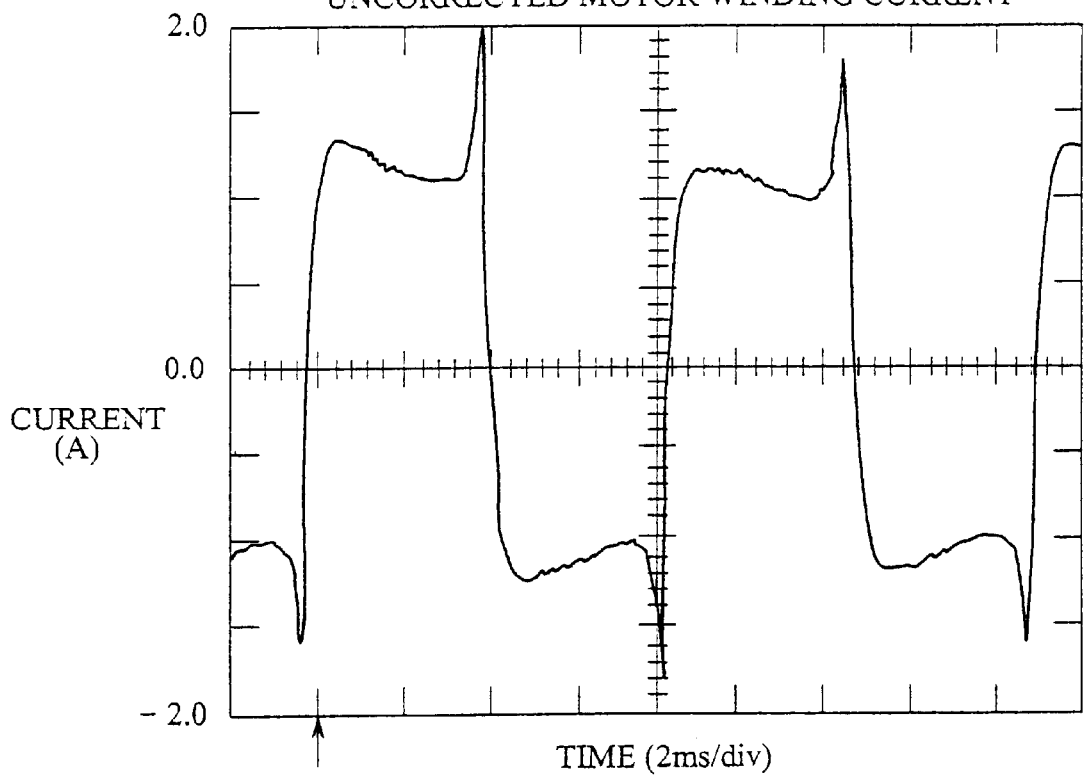
FIGS. 11A–11B illustrate two motor winding current waveforms in a motor operating at about 3500 RPM demonstrating typical waveform improvements of the pwm circuit of FIG. 7 when used with the pwm voltage regulator of FIG. 6.
Figure 11B:
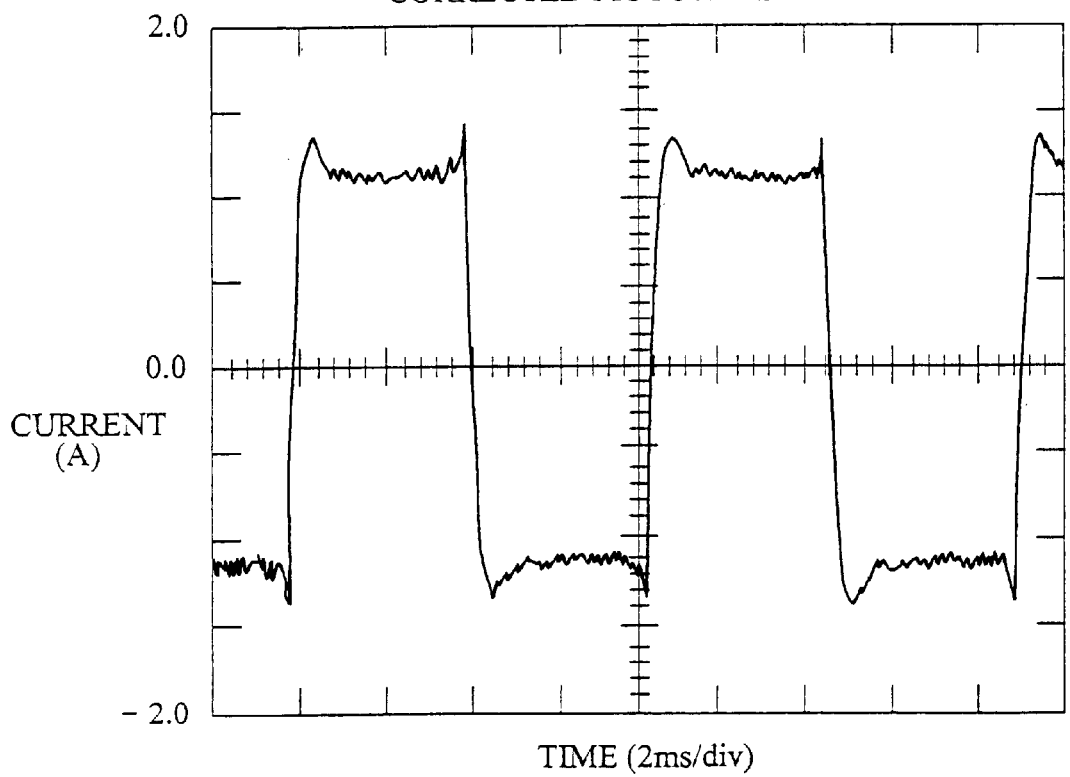

FIGS. 10A and 11A depict typical prior art pwm voltage regulator motor winding current waveforms resulting at motor speeds of about 2000 and 3500 RPM respectively. As can be seen, the motor winding waveforms are non-symmetrical within each pulse and non-symmetrical between cycles. Another advantage of the present invention is that symmetrical motor winding current waveforms, such as those depicted in FIGS. 10B and 11B, are attainable via application of the present invention to brushless DC motors such as those used in the prior art.

Those skilled in the pertinent art may recognize, based on the teachings herein, that the aforementioned method of motor speed regulation may be applied to time-varying motor control with relative ease by application of a time-varying motor reference signal to the present invention. Accordingly, the method of the present invention may further comprise the steps of controlling a pulse width of the pulsed motor supply signal to control the average voltage level of the pulsed motor supply signal in response to a control input via the reference voltage corresponding to a desired change in the angular velocity of the motor.

Accordingly, although this invention has been shown and described with respect to exemplary embodiments thereof, it should be understood by those skilled in the art that the foregoing and various other changes, omissions, and additions in the form and detail thereof may be made therein without departing from the spirit and scope of the invention.

What is claimed is:

1. A method of regulating the rotational speed of a DC brushless motor having at least one input terminal, a plurality of motor windings electrically coupled to the at least one input terminal, and a rotor defining a rotor mass and electromagnetically coupled to the motor windings and rotatable by interaction with an electromagnetic field generated by current flowing through the motor windings, the method comprising the following steps:

passing motor supply signals from an electrical power source through an electrical conduction switch having an input, an output, and a control terminal;

pulse width modulating the motor supply signals passing through the electrical conduction switch and generating pulse width modulated motor supply signals;

transmitting the pulse width modulated motor supply signals through a substantially inductorless path extending from the output of the electrical conduction switch to the at least one input terminal;

using the windings of the motor to integrate the pulse width modulated motor supply signals and function as an inductor filter to smooth the current level of the motor supply signals; and using the rotor mass as a filter capacitor to smooth the voltage level of the motor supply signals.

2. A method as defined in claim 1, further comprising the step of transmitting the pulse width modulated motor supply signals through a substantially inductorless path extending from the output of the electrical conduction switch to a center tap input terminal of the DC brushless motor.

3. A method as defined in claim 1, further comprising the steps of generating a differential signal having a voltage level indicative of the difference in voltage between a voltage level corresponding to the voltage level of at least one motor supply signal and a reference voltage, and pulse width modulating the motor supply signal in response to the value of the differential signal to further provide a substantially constant voltage level of the motor supply signal.

4. A method defined in claim 3, further comprising the step of averaging a voltage level of at least one motor supply signal, generating an approximately averaged signal, and generating the differential signal based on the averaged signal.

5. A method as defined in claim 4, further comprising the step of reducing the voltage level of the averaged signal, and wherein the generating step further comprises generating a voltage level indicative of the difference in voltage between the reduced voltage level of the averaged signal and the reference voltage.

6. A method as defined in claim 3, further comprising the steps of:

(a) at least one of (i) increasing a pulse width of the motor supply signal to increase the voltage level of the motor supply signal to a selected voltage level corresponding to a selected motor speed; and (ii) decreasing the pulse width of the motor supply signal to decrease the voltage level of the motor supply signal to a selected voltage level corresponding to a selected motor speed; and (b) modulating the step of passing the motor supply signal in response to the value of the differential signal to further provide a substantially constant selected voltage level to maintain the selected motor speed.

7. A method as defined in claim 1, further comprising the step of transmitting the pulse width modulated motor supply signals through a substantially inductorless and capacitor-less path extending from the output of the electrical conduction switch to a center tap input terminal of the DC brushless motor.

8. A control circuit for regulating the rotational speed of a DC brushless motor having at least one input terminal, a plurality of motor windings electrically coupled to the at least one input terminal, and a rotor defining a rotor mass and electromagnetically coupled to the motor windings and rotatable by interaction with an electromagnetic field generated by current flowing through the motor windings, the control circuit comprising:

an electrical conduction switch having an input, an output and a control terminal for passing a motor supply signal to the DC brushless motor from a voltage across first and second terminals of a DC voltage source, the input terminal of the switch being coupled to the first terminal of the DC voltage source, and the output terminal of the switch being coupled to the at least one input terminal of the motor;

a substantially inductorless path extending from the output of the electrical conduction switch to the at least one input terminal of the motor;

a pulse width modulator having an output terminal coupled to the control terminal of the electrical conduction switch for pulse width modulating the motor supply signals passing through the electrical conduction switch and generating pulse width modulated motor supply signals, wherein:

the pulse width modulated motor supply signals are transmitted through the substantially inductorless path extending from the output of the electrical conduction switch to the at least one input terminal;

the windings of the motor integrate the pulse width modulated motor supply signals and function as an inductor filter to smooth the current level of the motor supply signals; and the rotor mass functions as a filter capacitor to smooth the voltage level of the motor supply signals.

9. A control circuit as defined in claim 8, further comprising:

a differential (error) amplifier having first and second input terminals and an output terminal for generating a differential signal having a voltage level indicative of the difference between a voltage level corresponding to the voltage level of the motor supply signal and a reference voltage, the first input terminal of the differential amplifier being coupled to a voltage reference, and the second input terminal of the differential amplifier being coupled to the output terminal of the switch; and wherein the input terminal of the pulse width modulator is coupled to the output terminal of the differential amplifier, such that the pulse width modulator generates a modulated signal having a pulse width indicative of the voltage level of the differential signal to turn the switch on and off to modulate the motor supply signal and further generate a substantially constant selected voltage level to the motor supply signal.

10. A control unit as defined in claim 8, further defining a capacitorless path extending from the output of the electrical conduction switch to a center tap input terminal of the DC brushless motor, and wherein the pulse width modulated motor supply signals are transmitted through the substantially inductorless and capacitorless path extending from the output of the electrical conduction switch to a center tap input terminal of the DC brushless motor.

11. A control circuit as defined in claim 8, further comprising a DC brushless motor.

12. A control circuit as defined in claim 8, wherein the electrical conduction switch is a power transistor.

13. A control circuit for regulating the rotational speed of a DC brushless motor having at least one input terminal, a plurality of motor windings electrically coupled to the at least one input terminal, and a rotor defining a rotor mass and electromagnetically coupled to the motor windings and rotatable by interaction with an electromagnetic field generated by current flowing through the motor windings, the control circuit comprising:

first means coupled to an electrical power source for switchably passing a motor supply signal to the at least one input terminal of the DC brushless motor;

second means for pulse width modulating the motor supply signals passing through the electrical conduction switch and generating pulse width modulated motor supply signals;

third means for transmitting the pulse width modulated motor supply signals through a substantially inductorless path extending from the output of the electrical conduction switch to the at least one input terminal;

fourth means within the windings of the motor for integrating the pulse width modulated motor supply signals and functioning as an inductor filter to smooth the current level of the motor supply signals; and fifth means within the rotor for functioning as a filter capacitor to smooth the voltage level of the motor supply signals.

14. A control circuit as defined in claim 13, further comprising:

means coupled to an output of the first means for generating a differential signal having a voltage level indicative of the difference between a voltage level corresponding to the voltage level of the motor supply signal and a reference voltage; and wherein the second means turns on and off the first means in response to the value of the differential signal.

15. A control circuit as defined in claim 13, further comprising means for transmitting the pulse width modulated motor supply signals through a capacitorless path extending from the output of the electrical conduction switch to a center tap input terminal of the DC brushless motor.

16. A control circuit as defined in claim 15, wherein said means is a capacitorless connection extending from the output of the electrical conduction switch to the at least one input terminal.

17. A control circuit as defined in claim 13, further comprising a DC brushless motor.

18. A control circuit as defined in claim 13, wherein the fourth means is the windings of the motor.

19. A control circuit as defined in claim 13, wherein the rotor defines a rotor mass, and the fifth means is the mass of the rotor.

20. A control circuit as defined in claim 13, wherein the first means is an electrical conduction switch.

21. A control circuit as defined in claim 13, wherein the third means is an inductorless connection extending from the output of the electrical conduction switch to the at least one input terminal.

* * * * *